(12) United States Patent
Higgins et al.

(10) Patent No.: US 9,652,381 B2
(45) Date of Patent: May 16, 2017

(54) SUB-BLOCK GARBAGE COLLECTION

(71) Applicant: SanDisk Enterprise IP LLC, Milpitas, CA (US)

(72) Inventors: James M. Higgins, Chandler, AZ (US); James Fitzpatrick, Sudbury, MA (US); Mark Dancho, Chandler, AZ (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/311,152

(22) Filed: Jun. 20, 2014

(65) Prior Publication Data
US 2015/0370701 A1 Dec. 24, 2015

Related U.S. Application Data

(60) Provisional application No. 62/014,461, filed on Jun. 19, 2014.

(51) Int. Cl.
*G06F 12/02* (2006.01)
(52) U.S. Cl.
CPC ...... *G06F 12/0253* (2013.01); *G06F 12/0246* (2013.01); *G06F 2212/7205* (2013.01)
(58) Field of Classification Search
CPC .................................................. G06F 12/0253
(Continued)

(56) References Cited
U.S. PATENT DOCUMENTS 4,173,737 A 11/1979 Skerlos et al.
4,888,750 A 12/1989 Kryder et al.
(Continued)

FOREIGN PATENT DOCUMENTS

EP 1 299 800 4/2003
EP 1 465 203 A1 10/2004
(Continued)

OTHER PUBLICATIONS

International Search Report and Written Opinion dated Jul. 25, 2014, received in International Patent Application No. PCT/US2014/029453, which corresponds to U.S. Appl. No. 13/963,444, 9 pages (Frayer).
Barr. "Introduction to Watchdog Timers," Oct. 2001 3 pgs.
Canim, "Buffered Bloom Filters on Solid State Storage," ADMS*10, Singapore, Sep. 13-17, 2010, 8 pgs.
Kang, "A Multi-Channel Architecture for High-Performance NAND Flash-Based Storage System," J. Syst. Archit., vol. 53, Issue 9, Sep. 2007, 15 pgs.
Kim, "A Space-Efficient Flash Translation Layer for CompactFlash Systems," May 2002, IEEE vol. 48, No. 2, 10 pgs.
(Continued)

*Primary Examiner* — Yaima Rigol
*Assistant Examiner* — Gautam Sain
(74) *Attorney, Agent, or Firm* — Morgan, Lewis & Bockius LLP

(57) ABSTRACT

Systems, methods and/or devices are used to enable garbage collection of a sub-block of an individually erasable block of a storage medium in a storage device. In one aspect, the method includes determining a first trigger parameter in accordance with one or more operating conditions of a first sub-block of an erase block in the storage medium, and determining a second trigger parameter in accordance with one or more operating conditions of a second sub-block of the erase block in the storage medium. In accordance with a determination that the first trigger parameter meets a first vulnerability criterion, garbage collection of the first sub-block is enabled. Furthermore, in accordance with a determination that the second trigger parameter meets a second vulnerability criterion, garbage collection of the second sub-block is enabled.

24 Claims, 10 Drawing Sheets

(58) Field of Classification Search
USPC .......................................................... 711/103
See application file for complete search history.

(56) References Cited

U.S. PATENT DOCUMENTS

| | | |
|---|---|---|
| 4,916,652 A | 4/1990 | Schwarz et al. |
| 5,129,089 A | 7/1992 | Nielsen |
| 5,270,979 A | 12/1993 | Harari et al. |
| 5,329,491 A | 7/1994 | Brown et al. |
| 5,381,528 A | 1/1995 | Brunelle |
| 5,404,485 A | 4/1995 | Ban |
| 5,488,702 A | 1/1996 | Byers et al. |
| 5,519,847 A | 5/1996 | Fandrich et al. |
| 5,530,705 A | 6/1996 | Malone |
| 5,537,555 A | 7/1996 | Landry |
| 5,551,003 A | 8/1996 | Mattson et al. |
| 5,636,342 A | 6/1997 | Jeffries |
| 5,657,332 A | 8/1997 | Auclair et al. |
| 5,666,114 A | 9/1997 | Brodie et al. |
| 5,708,849 A | 1/1998 | Coke et al. |
| 5,765,185 A | 6/1998 | Lambrache et al. |
| 5,890,193 A | 3/1999 | Chevallier |
| 5,930,188 A | 7/1999 | Roohparvar |
| 5,936,884 A | 8/1999 | Hasbun et al. |
| 5,943,692 A | 8/1999 | Marberg et al. |
| 5,946,714 A | 8/1999 | Miyauchi |
| 5,982,664 A | 11/1999 | Watanabe |
| 6,000,006 A | 12/1999 | Bruce et al. |
| 6,006,345 A | 12/1999 | Berry, Jr. |
| 6,016,560 A | 1/2000 | Wada et al. |
| 6,018,304 A | 1/2000 | Bessios |
| 6,044,472 A | 3/2000 | Crohas |
| 6,070,074 A | 5/2000 | Perahia et al. |
| 6,104,304 A | 8/2000 | Clark et al. |
| 6,119,250 A | 9/2000 | Nishimura et al. |
| 6,138,261 A | 10/2000 | Wilcoxson et al. |
| 6,182,264 B1 | 1/2001 | Ott |
| 6,192,092 B1 | 2/2001 | Dizon et al. |
| 6,260,120 B1 | 7/2001 | Blumenau et al. |
| 6,295,592 B1 | 9/2001 | Jeddeloh et al. |
| 6,311,263 B1 | 10/2001 | Barlow et al. |
| 6,408,394 B1 | 6/2002 | Vander Kamp et al. |
| 6,412,042 B1 | 6/2002 | Paterson et al. |
| 6,442,076 B1 | 8/2002 | Roohparvar |
| 6,449,625 B1 | 9/2002 | Wang |
| 6,484,224 B1 | 11/2002 | Robins et al. |
| 6,516,437 B1 | 2/2003 | Van Stralen et al. |
| 6,564,285 B1 | 5/2003 | Mills et al. |
| 6,647,387 B1 | 11/2003 | McKean et al. |
| 6,678,788 B1 | 1/2004 | O'Connell |
| 6,728,879 B1 | 4/2004 | Atkinson |
| 6,757,768 B1 | 6/2004 | Potter et al. |
| 6,775,792 B2 | 8/2004 | Ulrich et al. |
| 6,810,440 B2 | 10/2004 | Micalizzi, Jr. et al. |
| 6,836,808 B2 | 12/2004 | Bunce et al. |
| 6,836,815 B1 | 12/2004 | Purcell et al. |
| 6,842,436 B2 | 1/2005 | Moeller |
| 6,865,650 B1 | 3/2005 | Morley et al. |
| 6,871,257 B2 | 3/2005 | Conley et al. |
| 6,895,464 B2 | 5/2005 | Chow et al. |
| 6,934,755 B1 | 8/2005 | Saulpaugh et al. |
| 6,966,006 B2 | 11/2005 | Pacheco et al. |
| 6,978,343 B1 | 12/2005 | Ichiriu |
| 6,980,985 B1 | 12/2005 | Amer-Yahia et al. |
| 6,981,205 B2 | 12/2005 | Fukushima et al. |
| 6,988,171 B2 | 1/2006 | Beardsley et al. |
| 7,020,017 B2 | 3/2006 | Chen et al. |
| 7,024,514 B2 | 4/2006 | Mukaida et al. |
| 7,028,165 B2 | 4/2006 | Roth et al. |
| 7,032,123 B2 | 4/2006 | Kane et al. |
| 7,043,505 B1 | 5/2006 | Teague et al. |
| 7,076,598 B2 | 7/2006 | Wang |
| 7,100,002 B2 | 8/2006 | Shrader et al. |
| 7,102,860 B2 | 9/2006 | Wenzel |
| 7,111,293 B1 | 9/2006 | Hersh et al. |
| 7,126,873 B2 | 10/2006 | See et al. |
| 7,133,282 B2 | 11/2006 | Sone |
| 7,155,579 B1 | 12/2006 | Neils et al. |
| 7,162,678 B2 | 1/2007 | Saliba |
| 7,173,852 B2 | 2/2007 | Gorobets et al. |
| 7,184,446 B2 | 2/2007 | Rashid et al. |
| 7,212,440 B2 | 5/2007 | Gorobets |
| 7,269,755 B2 | 9/2007 | Moshayedi et al. |
| 7,275,170 B2 | 9/2007 | Suzuki |
| 7,295,479 B2 | 11/2007 | Yoon et al. |
| 7,328,377 B1 | 2/2008 | Lewis et al. |
| 7,426,633 B2 | 9/2008 | Thompson et al. |
| 7,486,561 B2 | 2/2009 | Mokhlesi |
| 7,516,292 B2 | 4/2009 | Kimura et al. |
| 7,523,157 B2 | 4/2009 | Aguilar, Jr. et al. |
| 7,527,466 B2 | 5/2009 | Simmons |
| 7,529,466 B2 | 5/2009 | Takahashi |
| 7,533,214 B2 | 5/2009 | Aasheim et al. |
| 7,546,478 B2 | 6/2009 | Kubo et al. |
| 7,566,987 B2 | 7/2009 | Black et al. |
| 7,571,277 B2 | 8/2009 | Mizushima |
| 7,574,554 B2 | 8/2009 | Tanaka et al. |
| 7,596,643 B2 | 9/2009 | Merry et al. |
| 7,669,003 B2 | 2/2010 | Sinclair et al. |
| 7,681,106 B2 | 3/2010 | Jarrar et al. |
| 7,685,494 B1 | 3/2010 | Varnica et al. |
| 7,707,481 B2 | 4/2010 | Kirschner et al. |
| 7,761,655 B2 | 7/2010 | Mizushima et al. |
| 7,765,454 B2 | 7/2010 | Passint |
| 7,774,390 B2 | 8/2010 | Shin |
| 7,809,836 B2 | 10/2010 | Mihm et al. |
| 7,840,762 B2 | 11/2010 | Oh et al. |
| 7,870,326 B2 | 1/2011 | Shin et al. |
| 7,890,818 B2 | 2/2011 | Kong et al. |
| 7,913,022 B1 | 3/2011 | Baxter |
| 7,925,960 B2 | 4/2011 | Ho et al. |
| 7,934,052 B2 | 4/2011 | Prins et al. |
| 7,945,825 B2 | 5/2011 | Cohen et al. |
| 7,954,041 B2 | 5/2011 | Hong et al. |
| 7,971,112 B2 | 6/2011 | Murata |
| 7,974,368 B2 | 7/2011 | Shieh et al. |
| 7,978,516 B2 | 7/2011 | Olbrich |
| 7,996,642 B1 | 8/2011 | Smith |
| 8,006,161 B2 | 8/2011 | Lestable et al. |
| 8,032,724 B1 | 10/2011 | Smith |
| 8,041,884 B2 | 10/2011 | Chang |
| 8,042,011 B2 | 10/2011 | Nicolaidis et al. |
| 8,069,390 B2 | 11/2011 | Lin |
| 8,190,967 B2 | 5/2012 | Hong et al. |
| 8,250,380 B2 | 8/2012 | Guyot |
| 8,254,181 B2 | 8/2012 | Hwang et al. |
| 8,259,506 B1 | 9/2012 | Sommer et al. |
| 8,261,020 B2 | 9/2012 | Krishnaprasad et al. |
| 8,312,349 B2 | 11/2012 | Reche et al. |
| 8,385,117 B2 | 2/2013 | Sakurada et al. |
| 8,412,985 B1 | 4/2013 | Bowers et al. |
| 8,429,436 B2 | 4/2013 | Fillingim et al. |
| 8,438,459 B2 | 5/2013 | Cho et al. |
| 8,453,022 B2 | 5/2013 | Katz |
| 8,473,680 B1 | 6/2013 | Pruthi |
| 8,510,499 B1 | 8/2013 | Banerjee |
| 8,531,888 B2 | 9/2013 | Chilappagari et al. |
| 8,554,984 B2 | 10/2013 | Yano et al. |
| 8,627,117 B2 | 1/2014 | Johnston |
| 8,634,248 B1 | 1/2014 | Sprouse et al. |
| 8,694,854 B1 | 4/2014 | Dar et al. |
| 8,724,789 B2 | 5/2014 | Altberg et al. |
| 8,775,741 B1 | 7/2014 | de la Iglesia |
| 8,788,778 B1 | 7/2014 | Boyle |
| 8,832,384 B1 | 9/2014 | de la Iglesia |
| 8,874,992 B2 | 10/2014 | Desireddi et al. |
| 8,885,434 B2 | 11/2014 | Kumar |
| 8,898,373 B1 * | 11/2014 | Kang et al. .................. 711/103 |
| 8,909,894 B1 | 12/2014 | Singh et al. |
| 8,910,030 B2 | 12/2014 | Goel |
| 8,923,066 B1 | 12/2014 | Subramanian et al. |
| 9,043,517 B1 | 5/2015 | Sprouse et al. |
| 9,128,690 B2 | 9/2015 | Lotzenburger et al. |
| 9,329,789 B1 | 5/2016 | Chu et al. |

(56) References Cited

U.S. PATENT DOCUMENTS

| | | |
|---|---|---|
| 2001/0026949 A1 | 10/2001 | Ogawa et al. |
| 2001/0050824 A1 | 12/2001 | Buch |
| 2002/0024846 A1 | 2/2002 | Kawahara et al. |
| 2002/0032891 A1 | 3/2002 | Yada et al. |
| 2002/0036515 A1 | 3/2002 | Eldridge et al. |
| 2002/0083299 A1 | 6/2002 | Van Huben et al. |
| 2002/0099904 A1 | 7/2002 | Conley |
| 2002/0116651 A1 | 8/2002 | Beckert et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2003/0225961 A1 | 12/2003 | Chow et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0085849 A1 | 5/2004 | Myoung et al. |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0158775 A1 | 8/2004 | Shibuya et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0210706 A1 | 10/2004 | In et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0138442 A1 | 6/2005 | Keller, Jr. et al. |
| 2005/0144358 A1 | 6/2005 | Conley et al. |
| 2005/0144361 A1 | 6/2005 | Gonzalez et al. |
| 2005/0144367 A1 | 6/2005 | Sinclair |
| 2005/0144516 A1 | 6/2005 | Gonzalez et al. |
| 2005/0154825 A1 | 7/2005 | Fair |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0210348 A1 | 9/2005 | Totsuka |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0281088 A1 | 12/2005 | Ishidoshiro et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0062054 A1 | 3/2006 | Hamilton et al. |
| 2006/0069932 A1 | 3/2006 | Oshikawa et al. |
| 2006/0085671 A1 | 4/2006 | Majni et al. |
| 2006/0087893 A1 | 4/2006 | Nishihara et al. |
| 2006/0103480 A1 | 5/2006 | Moon et al. |
| 2006/0107181 A1 | 5/2006 | Dave et al. |
| 2006/0136570 A1 | 6/2006 | Pandya |
| 2006/0136655 A1 | 6/2006 | Gorobets et al. |
| 2006/0136681 A1 | 6/2006 | Jain et al. |
| 2006/0156177 A1 | 7/2006 | Kottapalli et al. |
| 2006/0184738 A1 | 8/2006 | Bridges et al. |
| 2006/0195650 A1 | 8/2006 | Su et al. |
| 2006/0209592 A1 | 9/2006 | Li et al. |
| 2006/0224841 A1 | 10/2006 | Terai et al. |
| 2006/0244049 A1 | 11/2006 | Yaoi et al. |
| 2006/0259528 A1 | 11/2006 | Dussud et al. |
| 2006/0265568 A1 | 11/2006 | Burton |
| 2006/0291301 A1 | 12/2006 | Ziegelmayer |
| 2007/0011413 A1 | 1/2007 | Nonaka et al. |
| 2007/0033376 A1 | 2/2007 | Sinclair et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0101096 A1 | 5/2007 | Gorobets |
| 2007/0106679 A1 | 5/2007 | Perrin et al. |
| 2007/0113019 A1 | 5/2007 | Beukema |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujibayashi et al. |
| 2007/0180346 A1 | 8/2007 | Murin |
| 2007/0191993 A1 | 8/2007 | Wyatt |
| 2007/0201274 A1 | 8/2007 | Yu et al. |
| 2007/0204128 A1 | 8/2007 | Lee et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwell et al. |
| 2007/0268754 A1 | 11/2007 | Lee et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0052451 A1 | 2/2008 | Pua et al. |
| 2008/0056005 A1 | 3/2008 | Aritome |
| 2008/0059602 A1 | 3/2008 | Matsuda et al. |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0180084 A1 | 7/2008 | Dougherty et al. |
| 2008/0209282 A1 | 8/2008 | Lee et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2008/0320110 A1 | 12/2008 | Pathak |

(56) References Cited

U.S. PATENT DOCUMENTS

| | | |
|---|---|---|
| 2009/0003046 A1 | 1/2009 | Nirschl et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0158288 A1 | 6/2009 | Fulton et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0204823 A1 | 8/2009 | Giordano et al. |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0235128 A1 | 9/2009 | Eun et al. |
| 2009/0249160 A1 | 10/2009 | Gao et al. |
| 2009/0251962 A1 | 10/2009 | Yun et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0054034 A1 | 3/2010 | Furuta et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0185807 A1 | 7/2010 | Meng et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1 | 8/2010 | Moshayedi et al. |
| 2010/0208521 A1 | 8/2010 | Kim et al. |
| 2010/0257379 A1 | 10/2010 | Wang et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1 | 12/2010 | Trantham et al. |
| 2010/0332863 A1 | 12/2010 | Johnston |
| 2011/0010514 A1 | 1/2011 | Benhase et al. |
| 2011/0022779 A1 | 1/2011 | Lund et al. |
| 2011/0022819 A1 | 1/2011 | Post et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072207 A1 | 3/2011 | Jin et al. |
| 2011/0072302 A1 | 3/2011 | Sartore |
| 2011/0078407 A1 | 3/2011 | Lewis |
| 2011/0078496 A1* | 3/2011 | Jeddeloh ............... G06F 3/0616 714/6.24 |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1* | 8/2011 | Han et al. ................. 365/185.11 |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1* | 9/2011 | Goss et al. ..................... 711/103 |
| 2011/0225347 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1* | 10/2011 | Haines et al. ................ 711/103 |
| 2011/0271040 A1 | 11/2011 | Kamizono |
| 2011/0283119 A1 | 11/2011 | Szu et al. |
| 2011/0289125 A1 | 11/2011 | Guthery |
| 2011/0320733 A1 | 12/2011 | Sanford et al. |
| 2012/0011393 A1 | 1/2012 | Roberts et al. |
| 2012/0017053 A1 | 1/2012 | Yang et al. |
| 2012/0023144 A1* | 1/2012 | Rub ............................ 707/813 |
| 2012/0026799 A1 | 2/2012 | Lee |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |
| 2012/0117397 A1 | 5/2012 | Kolvick et al. |
| 2012/0124273 A1 | 5/2012 | Goss et al. |
| 2012/0131286 A1 | 5/2012 | Faith et al. |
| 2012/0151124 A1* | 6/2012 | Baek et al. ..................... 711/103 |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1 | 7/2012 | Takaku |
| 2012/0185750 A1 | 7/2012 | Hayami |
| 2012/0195126 A1 | 8/2012 | Roohparvar |
| 2012/0203804 A1 | 8/2012 | Burka et al. |
| 2012/0203951 A1 | 8/2012 | Wood et al. |
| 2012/0210095 A1 | 8/2012 | Nellans et al. |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239868 A1 | 9/2012 | Ryan et al. |
| 2012/0239976 A1 | 9/2012 | Cometti et al. |
| 2012/0246204 A1 | 9/2012 | Nalla et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284574 A1 | 11/2012 | Avila et al. |
| 2012/0284587 A1 | 11/2012 | Yu et al. |
| 2012/0297122 A1 | 11/2012 | Gorobets |
| 2013/0007073 A1 | 1/2013 | Varma |
| 2013/0007343 A1 | 1/2013 | Rub et al. |
| 2013/0007381 A1 | 1/2013 | Palmer |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |
| 2013/0038380 A1 | 2/2013 | Cordero et al. |
| 2013/0047045 A1 | 2/2013 | Hu et al. |
| 2013/0058145 A1 | 3/2013 | Yu et al. |
| 2013/0070527 A1 | 3/2013 | Sabbag et al. |
| 2013/0073784 A1 | 3/2013 | Ng et al. |
| 2013/0073798 A1 | 3/2013 | Kang et al. |
| 2013/0073924 A1 | 3/2013 | D'Abreu et al. |
| 2013/0079942 A1 | 3/2013 | Smola et al. |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |
| 2013/0103978 A1 | 4/2013 | Akutsu |
| 2013/0110891 A1 | 5/2013 | Ogasawara et al. |
| 2013/0111279 A1 | 5/2013 | Jeon et al. |

(56) References Cited

U.S. PATENT DOCUMENTS

| | | |
|---|---|---|
| 2013/0111298 A1 | 5/2013 | Seroff et al. |
| 2013/0117606 A1 | 5/2013 | Anholt et al. |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |
| 2013/0128666 A1 | 5/2013 | Avila et al. |
| 2013/0132647 A1 | 5/2013 | Melik-Martirosian |
| 2013/0132652 A1 | 5/2013 | Wood et al. |
| 2013/0159609 A1 | 6/2013 | Haas et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194865 A1 | 8/2013 | Bandic et al. |
| 2013/0194874 A1 | 8/2013 | Mu et al. |
| 2013/0232289 A1 | 9/2013 | Zhong et al. |
| 2013/0238576 A1 | 9/2013 | Binkert et al. |
| 2013/0254498 A1 | 9/2013 | Adachi et al. |
| 2013/0254507 A1 | 9/2013 | Islam et al. |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0297613 A1 | 11/2013 | Yu |
| 2013/0301373 A1 | 11/2013 | Tam |
| 2013/0304980 A1 | 11/2013 | Nachimuthu et al. |
| 2013/0314988 A1 | 11/2013 | Desireddi et al. |
| 2013/0343131 A1 | 12/2013 | Wu et al. |
| 2013/0346672 A1 | 12/2013 | Sengupta et al. |
| 2014/0013027 A1 | 1/2014 | Jannyavula Venkata et al. |
| 2014/0013188 A1 | 1/2014 | Wu et al. |
| 2014/0025864 A1 | 1/2014 | Zhang et al. |
| 2014/0032890 A1 | 1/2014 | Lee et al. |
| 2014/0063905 A1 | 3/2014 | Ahn et al. |
| 2014/0067761 A1 | 3/2014 | Chakrabarti et al. |
| 2014/0071761 A1 | 3/2014 | Sharon et al. |
| 2014/0075133 A1 | 3/2014 | Li et al. |
| 2014/0082261 A1 | 3/2014 | Cohen et al. |
| 2014/0082310 A1 | 3/2014 | Nakajima |
| 2014/0082456 A1 | 3/2014 | Liu et al. |
| 2014/0082459 A1 | 3/2014 | Li et al. |
| 2014/0095775 A1* | 4/2014 | Talagala et al. ............ 711/103 |
| 2014/0101389 A1 | 4/2014 | Nellans et al. |
| 2014/0115238 A1 | 4/2014 | Xi et al. |
| 2014/0122818 A1 | 5/2014 | Hayasaka et al. |
| 2014/0122907 A1 | 5/2014 | Johnston |
| 2014/0136762 A1 | 5/2014 | Li et al. |
| 2014/0136883 A1* | 5/2014 | Cohen ..................... 714/6.11 |
| 2014/0136927 A1 | 5/2014 | Li et al. |
| 2014/0143505 A1 | 5/2014 | Sim et al. |
| 2014/0153333 A1 | 6/2014 | Avila et al. |
| 2014/0157065 A1 | 6/2014 | Ong |
| 2014/0173224 A1 | 6/2014 | Fleischer et al. |
| 2014/0181458 A1 | 6/2014 | Loh et al. |
| 2014/0201596 A1 | 7/2014 | Baum et al. |
| 2014/0223084 A1 | 8/2014 | Lee et al. |
| 2014/0244578 A1 | 8/2014 | Winkelstraeter |
| 2014/0258755 A1 | 9/2014 | Stenfort |
| 2014/0269090 A1* | 9/2014 | Flynn et al. ............ 365/185.19 |
| 2014/0310494 A1 | 10/2014 | Higgins et al. |
| 2014/0359044 A1 | 12/2014 | Davis et al. |
| 2014/0359381 A1 | 12/2014 | Takeuchi et al. |
| 2015/0023097 A1 | 1/2015 | Khoueir et al. |
| 2015/0032967 A1 | 1/2015 | Udayashankar et al. |
| 2015/0037624 A1 | 2/2015 | Thompson et al. |
| 2015/0153799 A1 | 6/2015 | Lucas et al. |
| 2015/0153802 A1 | 6/2015 | Lucas et al. |
| 2015/0212943 A1 | 7/2015 | Yang et al. |
| 2015/0268879 A1 | 9/2015 | Chu |
| 2015/0286438 A1 | 10/2015 | Simionescu et al. |

FOREIGN PATENT DOCUMENTS

| | | |
|---|---|---|
| EP | 1 990 921 A2 | 11/2008 |
| EP | 2 386 958 A1 | 11/2011 |
| EP | 2 620 946 A2 | 7/2013 |
| JP | 2002-532806 | 10/2002 |
| WO | WO 2007/036834 | 4/2007 |
| WO | WO 2007/080586 | 7/2007 |
| WO | WO 2008/075292 A2 | 6/2008 |
| WO | WO 2008/121553 | 10/2008 |
| WO | WO 2008/121577 | 10/2008 |
| WO | WO 2009/028281 | 3/2009 |
| WO | WO 2009/032945 | 3/2009 |
| WO | WO 2009/058140 | 5/2009 |
| WO | WO 2009/084724 | 7/2009 |
| WO | WO 2009/134576 | 11/2009 |
| WO | WO 2011/024015 | 3/2011 |

OTHER PUBLICATIONS

Lu, "A Forest-structured Bloom Filter with Flash Memory," MSST 2011, Denver, CO, May 23-27, 2011, article, 6 pgs.

Lu, "A Forest-structured Bloom Filter with Flash Memory," MSST 2011, Denver, CO, May 27, 2011, presentation slides, 25 pgs.

McLean, "information Technology-AT Attachment with Packet Interface Extension," Aug. 19, 1998, 339 pgs.

Microchip Technology, "Section 10. Watchdog Timer and Power-Saving Modes," 2005, 14 pages.

Park et al., "A High Performance Controller for NAND Flash-Based Solid State Disk (NSSD)," Proceedings of Non-Volatile Semiconductor Memory Workshop, Feb. 2006. 4 pgs.

International Search Report and Written Opinion, dated Mar. 19, 2009 received in International Patent Application No. PCT/US08/88133, which corresponds to U.S. Appl. No. 12/082,202, 7 pgs (Prins).

International Search Report and Written Opinion, dated Mar. 19, 2009, received in International Patent Application No. PCT/US08/88136, which corresponds to U.S. Appl. No. 12/082,205, 7 pgs (Olbrich).

International Search Report and Written Opinion dated Feb. 26, 2009, received in International Patent Application No. PCT/US08/88146, which corresponds to U.S. Appl. No. 12/082,221, 10 pgs (Prins).

Internationai Search Report and Written Opinion dated Feb. 27, 2009, received in International Patent Application No. PCT/US2008/088154, which corresponds to U.S. Appl. No. 12/082,207, 8 pgs (Prins).

International Search Report and Written Opinion dated Feb. 13, 2009, received in International Patent Application No. PCT/US08/88164, which corresponds to U.S. Appl. No. 12/082,220, 6 pgs (Olbrich).

International Search Report and Written Opinion dated Feb. 18, 2009, received in International Patent Application No. PCT/US08/88206, which corresponds to U.S. Appl. No. 12/082,206, 8 pgs (Prins).

International Search Report and Written Opinion dated Feb. 19, 2009, received in International Patent Application No. PCT/US08/88217, which corresponds to U.S. Appl. No. 12/082,204, 7 pgs (Olbrich).

International Search Report and Written Opinion dated Feb. 13, 2009 received in International Patent Application No. PCT/US08/88229, which corresponds to U.S. Appl. No. 12/082,223, 7 pgs (Olbrich).

International Search Report and Written Opinion dated Feb. 19, 2009, received in International Patent Application No. PCT/US08/88232, which corresponds to U.S. Appl. No. 12/082,222, 8 pgs (Olbrich).

International Search Report and Written Opinion dated Feb. 19, 2009, received in International Patent Application No. PCT/US08/88236, which corresponds to U.S. Appl. No. 12/082,203, 7 pgs (Olbrich).

International Search Report and Written Opinion dated Oct. 27, 2011, received in International Patent Application No. PCT/US2011/028637, which corresponds to U.S. Appl. No. 12/728,200, 11 pgs (Olbrich).

European Search Report dated Feb. 23, 2012, received in European Patent Application No. 08866997.3, which corresponds to U.S. Appl. No. 12/082,207, 6 pgs (Prins).

(56) References Cited

OTHER PUBLICATIONS

International Search Report and Written Opinion dated Mar. 7, 2014, received in International Patent Application No. PCT/US2013/074772, which corresponds to U.S. Appl. No. 13/831,218, 10 pages (George).
International Search Report and Written Opinion dated Mar. 24, 2014, received in International Patent Application No. PCT/US2013/074777, which corresponds to U.S. Appl. No. 13/831,308, 10 pages. (George).
International Search Report and Written Opinion dated Mar. 7, 2014, received in International Patent Application No. PCT/US2013/074779, which corresponds to U.S. Appl. No. 13/831,374, 8 pages (George).
International Search Report and Written Opinion dated Aug. 31, 2012, received in International Patent Application PCT/US2012/042784, which corresponds to U.S. Appl. No. 13/285,873,12 pgs (Frayer).
International Search Report and Written Opinion dated Mar. 4, 2013, received in PCT/US2012/042771, which corresponds to U.S. Appl. No. 13/286,012, 14 pgs (Stonelake).
International Search Report and Written Opinion dated Sep. 26, 2012, received in International Patent Application No. PCT/US2012/042775, which corresponds to U.S. Appl. No. 13/285,892, 8 pgs (Weston-Lewis et al.).
International Search Report and Written Opinion dated Jun. 6, 2013, received in International Patent Application No. PCT/US2012/059447, which corresponds to U.S. Appl. No. 13/602,031, 12 pgs (Tai).
International Search Report and Written Opinion dated Jun. 6, 2013, received in International Patent Application No. PCT/US2012/059453, which corresponds to U.S. Appl. No. 13/602,039,12 pgs (Frayer).
International Search Report and Written Opinion dated Feb. 14, 2013, received in International Patent Application No. PCT/US2012/059459, which corresponds to U.S. Appl. No. 13/602,047, 9 pgs (Tai).
International Search Report and Written Opinion dated May 23, 2013, received in International Patent Application No. PCT/US2012/065914, which corresponds to U.S. Appl. No. 13/679,963, 7 pgs (Frayer).
International Search Report and Written Opinion dated Apr. 5, 2013 received in International Patent Application No. PCT/US2012/065916, which corresponds to U.S. Appl. No. 13/679,969, 7 pgs (Frayer).
International Search Report and Written Opinion dated Jun. 17, 2013, received in International Patent Application No. PCT/US2012/065919, which corresponds to U.S. Appl. No. 13/679,970, 8 pgs (Frayer).
SanDisk Enterprise IP LLC, Notification of the Decision to Grant a Patent Right for Patent for Invention, CN 200880127623.8, Jul. 4, 2013, 1 pg.
SanDisk Enterprise IP LLC, Office Action, CN 200880127623.8, Apr. 18, 2012, 12 pgs.
SanDisk Enterprise IP LLC, Office Action, CN 200880127623.8, Dec. 31, 2012, 9 pgs.
SanDisk Enterprise IP LLC, Office Action, JP 2010-540863, Jul, 24, 2012, 3 pgs.
Zeidman, 1999 Verilog Designer's Library, 9 pgs.
International Search Report and Written Opinion dated Jul. 23, 2015, received in International Patent Application No. PCT/US2015/030850, which corresponds to U.S. Appl. No. 14/298,843, 12 pages (Ellis).
Ashkenazi et al., "Platform independent overall security architecture in multi-processor system-on-chip integrated circuits for use in mobile phones and handheld devices," ScienceDirect, Computers and Electrical Engineering 33 (2007), 18 pages.
Bayer, "Prefix B-Trees", IP.com Journal, IP.com Inc., West Henrietta, NY, Mar. 30, 2007, 29 pages.

Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.
Lee et al., "A Semi-Preemptive Garbage Collector for Solid State Drives," Apr. 2011, IEEE, pp. 12-21.
Oracle, "Oracle9i: Database Concepts", Jul. 2001, http://docs.oracle.com/cd/A91202_01/901_doc/server.901/a88856.pdf, 49 pages.
Office Action dated Feb. 17, 2015, received in Chinese Patent Application No. 201210334987.1, which corresponds to U.S. Appl. No. 12/082,207, 9 pages (Prins).
International Search Report and Written Opinion dated May 4, 2015, received in International Patent Application No. PCT/US2014/065987, which corresponds to U.S. Appl. No. 14/135,400, 12 pages (George).
International Search Report and Written Opinion dated Mar. 17, 2015, received in International Patent Application No. PCT/US2014/067467, which corresponds to U.S. Appl. No. 14/135,420, 13 pages (Lucas).
International Search Report and Written Opinion dated Apr. 20, 2015, received in International Patent Application No. PCT/US2014/063949, which corresponds to U.S. Appl. No. 14/135,433, 21 pages (Delpapa).
International Search Report and Written Opinion dated Mar. 9, 2015, received in International Patent Application No. PCT/US2014/059747, which corresponds to U.S. Appl. No. 14/137,440, 9 pages (Fitzpatrick).
International Search Report and Written Opinion dated Jun. 8, 2015, received in International Patent Application No. PCT/US2015/018252, which corresponds to U.S. Appl. No. 14/339,072, 9 pages (Busch).
International Search Report and Written Opinion dated Jun. 2, 2015, received in International Patent Application No. PCT/US2015/018255, which corresponds to U.S. Appl. No. 14/336,967, 14 pages (Chander).
International Search Report and Written Opinion dated Jun. 30, 2015, received in International Patent Application No. PCT/US2015/023927, which corresponds to U.S. Appl. No. 14/454,687, 11 pages (Kadayam).
Invitation to Pay Additional Fees dated Feb. 13, 2015, received in International Patent Application No. PCT/US2014/063949, which corresponds to U.S. Appl. No. 14/135,433, 6 pages (Delpapa).
International Search Report and Written Opinion dated Jan. 21, 2015, received in International Application No. PCT/US2014/059748, which corresponds to U.S. Appl. No. 14/137,511, 13 pages (Dancho).
International Search Report and Written Opinion dated Feb. 18, 2015, received in International Application No. PCT/US2014/066921, which corresponds to U.S. Appl. No. 14/135,260, 13 pages (Fitzpatrick).
Gasior, "Gigabyte's i-Ram storage device, Ram disk without the fuss," The Tech Report, p. 1, Jan. 25, 2006, 5 pages.
IBM Research-Zurich, "The Fundamental Limit of Flash Random Write Performance: Understanding, Analysis and Performance Modeling," Mar. 31, 2010, pp. 1-15.
Oestreicher et al., "Object Lifetimes in Java Card," 1999, USENIX, 10 pages.
International Preliminary Report on Patentability dated May 24, 2016, received in International Patent Application No. PCT/US2014/065987, which corresponds to U.S. Appl. No. 14/135,400, 9 pages (George).
International Search Report and Written Opinion dated Sep. 14, 2015, received in International Patent Application No. PCT/US2015/036807, which corresponds to U.S. Appl. No. 14/311,152, 9 pages (Higgins).
Office Action dated Apr. 25, 2016, received in Chinese Patent Application No. 201280066282.4, which corresponds to U.S. Appl. No. 13/602,047, 8 pages (Tai).
Office Action dated Dec. 8, 2014, received in Chinese Patent Application No. 201180021660.2, which corresponds to U.S. Appl. No. 12/726,200, 7 pages (Olbrich).

(56) References Cited

OTHER PUBLICATIONS

Office Action dated Jul. 31, 2015, received in Chinese Patent Application No. 201180021660.2, which corresponds to U.S. Appl. No. 12/726,200, 9 pages (Olbrich).

International Preliminary Report on Patentability dated Dec. 6, 2016, received in International Patent Application No. PCT/US2015/030850, which corresponds to U.S. Appl. No. 14/298,843, 8 pages (Ellis).

International Preliminary Report on Patentability dated Dec. 20, 2016, received in International Patent Application No. PCT/US2015/036807, which corresponds to U.S. Appl. No. 14/311,152, 6 pages (Higgins).

* cited by examiner

SUB-BLOCK GARBAGE COLLECTION

RELATED APPLICATION

This application claims priority to U.S. Provisional Application Ser. No. 62/014,461, filed Jun. 19, 2014, which is incorporated herein by reference in its entirety.

TECHNICAL FIELD

The disclosed embodiments relate generally to non-volatile data storage systems, and in particular, to enabling garbage collection of a sub-block of an erase block in a non-volatile data storage device.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. Non-volatile memory retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Garbage collection is a process of memory management that reclaims portions of memory that no longer contain valid data. Using flash memory as an example, data is written to flash memory in units called pages, which are made up of multiple memory cells. However, flash memory is erased in larger units called blocks, which are made up of multiple pages. If some pages of a first block contain invalid data, those pages cannot be overwritten until the whole block containing those pages is erased. The process of garbage collection reads and re-writes the pages with valid data from the first block into a second block and then erases the first block. After garbage collection, the second block contains pages with valid data and free pages that are available for new data to be written. Since garbage collection involves re-writing valid data from one block to another, it results in "write amplification," which is the ratio of total bytes (or any other unit of data) written to flash memory in a flash-based storage system to total bytes written by host system(s) to the flash-based storage system. Reducing write amplification, through improved garbage collection, improves the life and performance of a flash-based storage system.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to enable garbage collection of a sub-block of a storage medium in a storage device. In one aspect, a trigger parameter (e.g., read-disturb count) and a vulnerability criterion (e.g., read-disturb threshold) are utilized in a garbage collection scheme.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
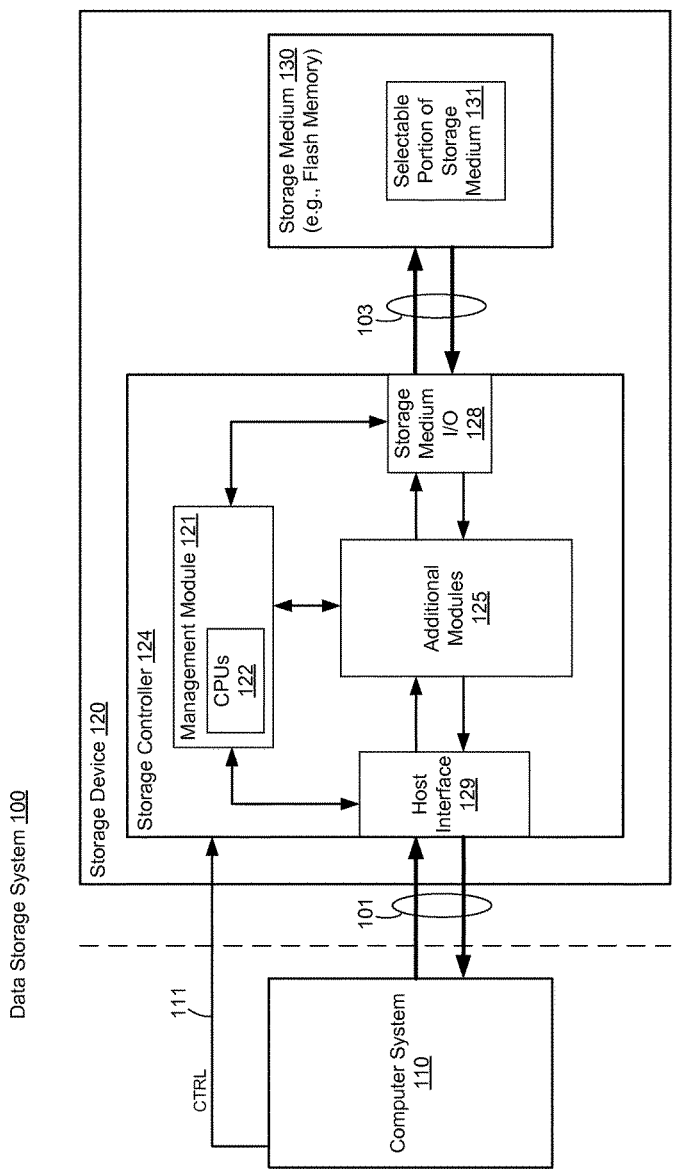
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable garbage collection of a sub-block of a storage medium in a storage device. Some implementations include systems, methods and/or devices for utilizing trigger parameters and vulnerability criteria in a garbage collection scheme.

More specifically, some implementations include a method of garbage collection for a storage medium in a storage system. In some implementations, the method includes determining a first trigger parameter in accordance with one or more operating conditions of a first sub-block of an erase block in the storage medium and determining a second trigger parameter in accordance with one or more operating conditions of a second sub-block of the erase block in the storage medium. In accordance with a determination that the first trigger parameter meets a first vulnerability criterion, garbage collection of the first sub-block is enabled, and in accordance with a determination that the second trigger parameter meets a second vulnerability criterion, garbage collection of the second sub-block is enabled.

An example of a trigger parameter, determined in accordance with one or more operating conditions of a sub-block of an erase block, is a read disturb count or read operation count, for the sub-block. More specifically, the one or more operating conditions are read operations being perform on data in the sub-block, and possibly in one or more neighboring sub-blocks or in one or more word lines neighboring the sub-block, and the trigger parameter is a count of those operations. Optionally, the count is a "straight," un-weighted count of read operations in a region of the storage medium corresponding to the sub-block. In some other implementations, however, the count is a weighted count, with read operations in some locations (e.g., in word lines spaced apart from the sub-block by a predefined number of intervening word lines) having a lower count weight than read operations in other locations (e.g., in the sub-block).

In some embodiments, the storage device includes one or more flash memory devices.

In some embodiments, the storage device includes one or more three-dimensional (3D) memory devices and circuitry associated with operation of memory elements in the one or more 3D memory devices. Furthermore, in some implementations, the circuitry and one or more memory elements in a respective 3D memory device, of the one or more 3D memory devices, are on the same substrate (e.g., a silicon substrate).

In some embodiments, the first sub-block is a portion of the erase block and the second sub-block is another portion of the erase block.

In some embodiments, the first vulnerability criterion is determined in accordance with one or more characteristics of the first sub-block.

In some implementations, the storage device enables garbage collection of the first sub-block in accordance with a determination that the erase block or a memory portion that includes the erase block meets predefined age criteria and a determination that the first trigger parameter meets a first vulnerability criterion.

In some embodiments, garbage collection includes writing from the first sub-block to a second erase block in the storage medium, wherein the second erase block is distinct from the erase block, and invalidating the first sub-block in the erase block (i.e., invalidating any valid data remaining in the first sub-block when the first sub-block is garbage collected).

In some embodiments, the storage device enables garbage collection for a parity stripe that includes the first sub-block, wherein the parity stripe includes a plurality of sub-blocks across a plurality of erase blocks in the storage medium.

In some embodiments, the second vulnerability criterion is determined in accordance with one or more characteristics of the second sub-block. In some implementations, the first vulnerability criterion is distinct from the second vulnerability criterion.

In some circumstances, garbage collection of the first sub-block is performed prior to garbage collection of the second sub-block.

In another aspect, the method includes determining a first trigger parameter in accordance with one or more operating conditions of a first sub-block of an erase block in the storage medium. In accordance with a determination that the first trigger parameter meets a first vulnerability criterion, garbage collection of the first sub-block is enabled. Furthermore, the method includes determining whether the erase block meets predefined garbage collection scheduling criteria. In accordance with a determination that the erase block meets said garbage collection scheduling criteria, garbage collection of the erase block is enabled.

In some embodiments, the storage device includes one or more flash memory devices.

In some embodiments, the storage device includes one or more three-dimensional (3D) memory devices and circuitry associated with operation of memory elements in the one or more 3D memory devices. Furthermore, in some implementations, the circuitry and one or more memory elements in a respective 3D memory device, of the one or more 3D memory devices, are on the same substrate (e.g., a silicon substrate).

In some embodiments, garbage collection includes writing from the first sub-block to a second erase block in the storage medium, wherein the second erase block is distinct from the erase block, and invalidating the first sub-block in the erase block.

In yet another aspect, a storage device includes one or more processors and memory storing one or more programs to be executed by the one or more processors. The one or more programs include instructions for determining a first trigger parameter in accordance with one or more operating conditions of a first sub-block of an erase block in the storage medium, and determining a second trigger parameter in accordance with one or more operating conditions of a second sub-block of the erase block in the storage medium. Furthermore, the one or more programs include instructions for enabling garbage collection of the first sub-block in accordance with a determination that the first trigger parameter meets a first vulnerability criterion, and enabling garbage collection of the second sub-block in accordance with a determination that the second trigger parameter meets a second vulnerability criterion.

In some embodiments, the storage device is further configured to operate in accordance with any of the methods described herein.

In yet another aspect, a storage device includes a means for determining a first trigger parameter in accordance with one or more operating conditions of a first sub-block of an erase block in the storage medium, and a means for determining a second trigger parameter in accordance with one or more operating conditions of a second sub-block of the erase block in the storage medium. Furthermore, the storage device includes a means for enabling, in accordance with a determination that the first trigger parameter meets a first vulnerability criterion, garbage collection of the first sub-block, and a means for enabling, in accordance with a determination that the second trigger parameter meets a second vulnerability criterion, garbage collection of the second sub-block.

In some embodiments, the storage device is further configured to operate in accordance with any of the methods described herein.

In yet another aspect, a storage system includes a storage medium, one or more processors, and memory storing one or more programs, which when executed by the one or more processors cause the storage system to perform or control performance of any of the methods described herein.

In yet another aspect, a non-transitory computer readable storage medium stores one or more programs configured for execution by one or more processors of a storage device, the one or more programs including instructions for performing any of the methods described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of data storage system 100, in accordance with some embodiments. While some example features are illustrated, various other features have not been illustrated for the sake of brevity and so as not to obscure more pertinent aspects of the example implementations disclosed herein. To that end, as a non-limiting example, data storage system 100 includes a storage device 120, which includes a storage controller 124 and a storage medium 130, and is used in conjunction with a computer system 110. In some implementations, storage medium 130 is a single flash memory device while in other implementations storage medium 130 includes a plurality of flash memory devices. In some implementations, storage medium 130 is NAND-type flash memory or NOR-type flash memory. In some implementations, storage medium 130 includes one or more three-dimensional (3D) memory devices, as further defined herein. Further, in some implementations storage controller 124 is a solid-state drive (SSD) controller. However, other types of storage media may be included in accordance with aspects of a wide variety of implementations.

Computer system 110 is coupled to storage controller 124 through data connections 101. However, in some implementations computer system 110 includes storage controller 124 as a component and/or a sub-system. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host or host system. In some implementations, computer system 110 includes one or more processors, one or more types of memory, a display and/or other user interface components such as a keyboard, a touch screen display, a mouse, a track-pad, a digital camera and/or any number of supplemental devices to add functionality.

Storage medium 130 is coupled to storage controller 124 through connections 103. Connections 103 are sometimes called data connections, but typically convey commands in addition to data, and optionally convey metadata, error correction information and/or other information in addition to data values to be stored in storage medium 130 and data values read from storage medium 130. In some implementations, however, storage controller 124 and storage medium 130 are included in the same device as components thereof. Furthermore, in some implementations storage controller 124 and storage medium 130 are embedded in a host device, such as a mobile device, tablet, other computer or computer controlled device, and the methods described herein are performed by the embedded memory controller. Storage medium 130 may include any number (i.e., one or more) of memory devices including, without limitation, non-volatile semiconductor memory devices, such as flash memory. For example, flash memory devices can be configured for enterprise storage suitable for applications such as cloud computing, or for caching data stored (or to be stored) in secondary storage, such as hard disk drives. Additionally and/or alternatively, flash memory can also be configured for relatively smaller-scale applications such as personal flash drives or hard-disk replacements for personal, laptop and tablet computers. In some embodiments, storage medium 130 includes one or more three-dimensional (3D) memory devices, as further defined herein.

Storage medium 130 is divided into a number of addressable and individually selectable blocks, such as selectable portion 131. In some implementations, the individually selectable blocks (sometimes referred to as "erase blocks") are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some implementations (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device. The number of pages included in each block varies from one implementation to another; examples are 64, 128 and 256 pages, but other numbers of pages per block are suitable in some implementations.

A sub-block is smaller than an individually selectable block and is a subset of an individually selectable block. For example, in some embodiments, a sub-block is a page. Furthermore, in some embodiments, a sub-block is a word line (or all the pages in a word line). In other embodiments, a sub-block is any sub-portion of an erase block, such as a contiguous group of word lines, sometimes herein called a zone. In some embodiments, a zone is a grouping of two or more pages of an erase block, where a respective erase block includes multiple zones. For example, as described with respect to FIG. 3, pages 304-1 to 304-4 form one zone of N total zones of erase block 300-1.

In some embodiments, a sub-block of a block in a three-dimensional memory device (see, for example, FIG. 7) contains a plurality of word lines in the same layer of a three-dimensional array of non-volatile memory cells. For example, in some implementations, in a three-dimensional memory device having N (e.g., 48) layers of memory cells, each erase block includes a plurality of word lines at each layer of the three-dimensional memory device, and thus includes A×N word lines, where A is the number of word lines in each layer that are included in the erase block. Continuing this example, a particular sub-block of the erase block includes all the word lines of the erase block that are located in a single layer of memory cells (e.g., the layer closest to the substrate of the three-dimensional memory device) or, alternatively, includes all the word lines in the erase block in a contiguous set of layers of the three-dimensional memory device.

In some implementations, storage controller 124 includes a management module 121, a host interface 129, a storage medium interface (I/O) 128, and additional module(s) 125. Storage controller 124 may include various additional features that have not been illustrated for the sake of brevity and so as not to obscure more pertinent features of the example implementations disclosed herein, and a different arrangement of features may be possible. Host interface 129 provides an interface to computer system 110 through data connections 101. Similarly, storage medium I/O 128 provides an interface to storage medium 130 though connections 103. In some implementations, storage medium I/O 128 includes read and write circuitry, including circuitry capable of providing reading signals to storage medium 130 (e.g., reading threshold voltages for NAND-type flash memory).

In some implementations, management module 121 includes one or more processing units (CPUs, also sometimes called processors) 122 configured to execute instructions in one or more programs (e.g., in management module 121). In some implementations, the one or more CPUs 122 are shared by one or more components within, and in some cases, beyond the function of storage controller 124. Management module 121 is coupled to host interface 129, additional module(s) 125 and storage medium I/O 128 in order to coordinate the operation of these components.

Additional module(s) 125 are coupled to storage medium I/O 128, host interface 129, and management module 121. As an example, additional module(s) 125 may include an error control module to limit the number of uncorrectable errors inadvertently introduced into data during writes to memory or reads from memory. In some embodiments, additional module(s) 125 are executed in software by the one or more CPUs 122 of management module 121, and, in other embodiments, additional module(s) 125 are implemented in whole or in part using special purpose circuitry (e.g., to perform encoding and decoding functions).

During a write operation, host interface 129 receives data to be stored in storage medium 130 from computer system 110. The data held in host interface 129 is made available to an encoder (e.g., in additional module(s) 125), which encodes the data to produce one or more codewords. The one or more codewords are made available to storage medium I/O 128, which transfers the one or more codewords to storage medium 130 in a manner dependent on the type of storage medium being utilized.

A read operation is initiated when computer system (host) 110 sends one or more host read commands on control line 111 to storage controller 124 requesting data from storage medium 130. Storage controller 124 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to a decoder (e.g., in additional module(s) 125). If the decoding is successful, the decoded data is provided to host interface 129, where the decoded data is made available to computer system 110. In some implementations, if the decoding is not successful, storage controller 124 may resort to a number of remedial actions or provide an indication of an irresolvable error condition.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some implementations, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals, reading voltages, and/or read thresholds) applied to a flash memory cells are gate voltages applied to the gates of the flash memory cells to determine whether the memory cells conduct current at that gate voltage. In some implementations, when a flash memory cell's transistor conducts current at a given reading threshold voltage, indicating that the cell voltage is less than the reading threshold voltage, the raw data value for that read operation is a "1," and otherwise the raw data value is a "0."

As explained above, a storage medium (e.g., storage medium 130) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page).

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages with valid data in that block are read and re-written to a new block and the old block is erased (or put on a queue for erasing). This process is called garbage collection. After garbage collection, the new block contains pages with valid data and free pages that are available for new data to be written, and the old block that was erased is also available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., storage medium 130) is a multiple of the logical amount of data intended to be written by a host (e.g., computer system 110, sometimes called a host). As discussed above, when a storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation (1):

$$\frac{\text{amount of data written to a storage medium}}{\text{amount of data written by a host}} \qquad (1)$$

Further, operating at higher temperatures may cause retention charge loss on blocks that are cold (e.g., idle for an extended period of time from the last program command). Read patrolling is utilized to manage this operation retention issue.

With the scaling of process nodes to sub-nanometer levels, the endurance of storage mediums (e.g., NAND flash memories) is declining. Endurance degradation may result from drifting of cell voltages due to program disturb (e.g., during write operations), over programming, read disturb (e.g., during read operations), and retention effects. In order to maintain the reliability of the storage medium and avoid data loss, a storage system can be configured to use background read patrol mechanisms and read disturb counts to determine when the data in a block should be relocated before it becomes ECC uncorrectable.

Figure 2:
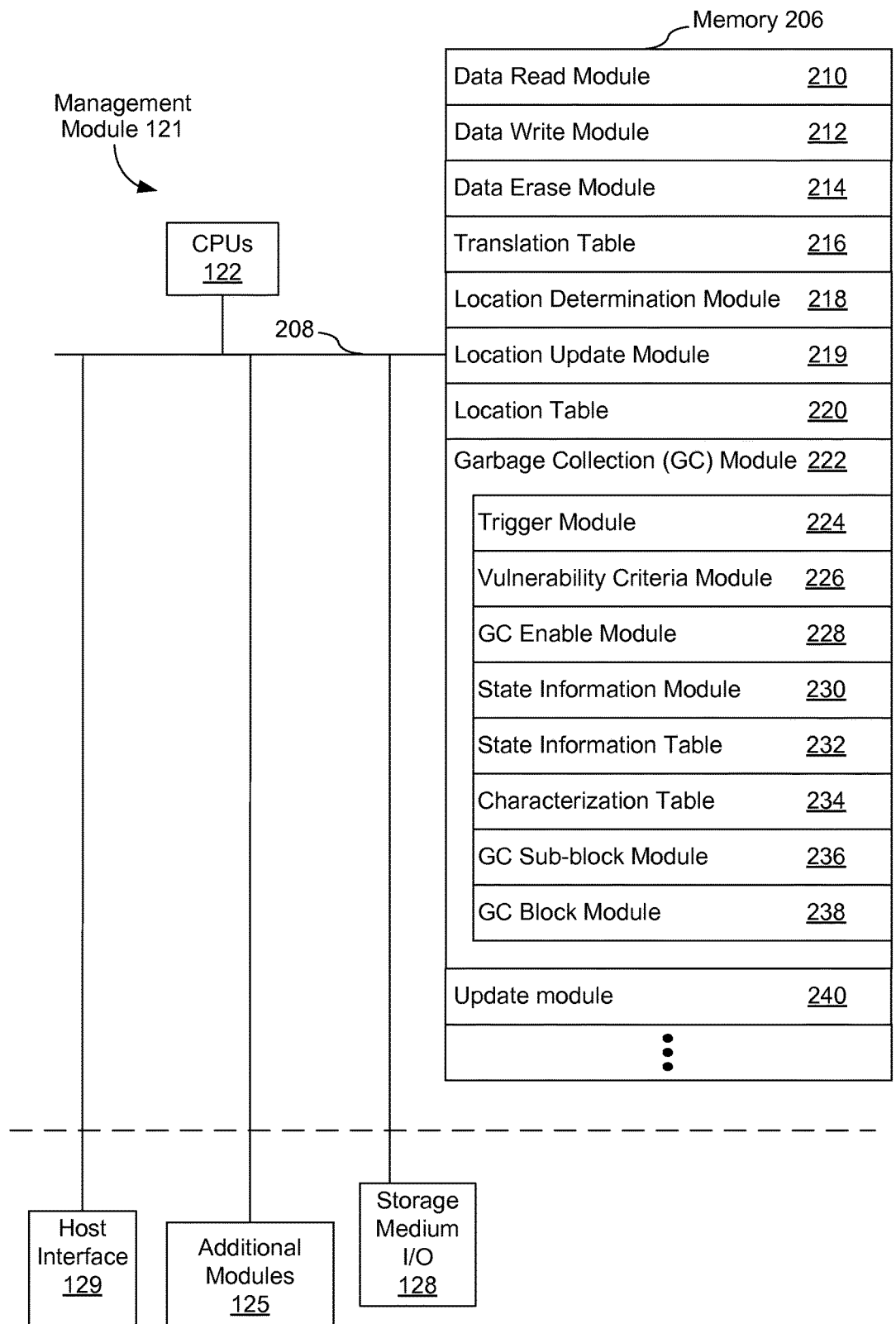
FIG. 2 is a block diagram illustrating an exemplary management module, in accordance with some embodiments.

FIG. 2 is a block diagram illustrating an exemplary management module 121, in accordance with some embodiments. Management module 121 typically includes one or more processing units (CPUs) 122 for executing modules, programs and/or instructions stored in memory 206 and thereby performing processing operations, memory 206, and one or more communication buses 208 for interconnecting these components. Communication buses 208 optionally include circuitry (sometimes called a chipset) that interconnects and controls communications between system components. Management module 121 is coupled to host interface 129, additional module(s) 125, and storage medium I/O 128 by communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset thereof:
- a data read module 210 that is used for reading data from one or more blocks in a storage medium;
- a data write module 212 that is used for writing data to one or more blocks in a storage medium;
- a data erase module 214 that is used for erasing data from one or more blocks in a storage medium;
- a translation table 216 that is used for mapping logical addresses to physical addresses;
- (optionally) a location determination module 218 that is used for determining a variation location (e.g., the end of a taper region) for each column or block of storage medium 130;
- (optionally) a location update module 219 for determining an updated variation location for each column or block of storage medium 130;
- (optionally) a location table 220 storing the variation location determined by location determination module 218 and/or the updated variation location determined by location update module 219 for each column or block of storage medium 130;
- a garbage collection module 222 that is used for garbage collection for one or more sub-blocks and/or blocks in a storage medium 130, which optionally includes the following modules or sub-modules, or a subset thereof:
  - a trigger module 224 that is used for selecting and/or determining one or more trigger parameters (e.g., read-disturb count) in accordance with one or more operating conditions of a sub-block;
  - a vulnerability criteria module 226 that is used for configuring one or more pre-defined threshold limits for one or more trigger parameters selected and/or determined by trigger module 224;
  - a garbage collection enable module 228 that is used for determining whether a trigger parameter meets a vulnerability criterion, and for enabling garbage collection of one or more sub-blocks in accordance with the determination;
  - a state information module 230 that is used for determining and/or retrieving state information (described in greater detail with respect to FIG. 8A) of one or more sub-blocks and/or blocks, including a read-disturb count, data retention parameters (e.g., bit error rate), and/or an age of the storage medium 130;
  - a state information table 232 that is used for storing state information determined and/or retrieved by state information module 230;
  - a characterization table 234 that is used for storing one or more characteristics of a sub-block (described in greater detail with respect to FIG. 8B);
  - a garbage collection sub-block module 236 that is used to garbage collect sub-blocks of storage medium 130 that have been enabled for garbage collection;
  - a garbage collection block module 238 that is used to garbage collect individually erasable blocks (erase blocks) of storage medium 130 that have been enabled for garbage collection; and
- an update module 240 that is used for updating translation table 216 after garbage collection of one or more sub-blocks and/or blocks has been performed.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing any of the methods described below with reference to FIGS. 8A-8C and 9.

Although FIG. 2 shows management module 121 in accordance with some embodiments, FIG. 2 is intended more as a functional description of the various features which may be present in management module 121 than as a structural schematic of the embodiments described herein. In practice, and as recognized by those of ordinary skill in the art, items shown separately could be combined and some items could be separated.

Figure 3:
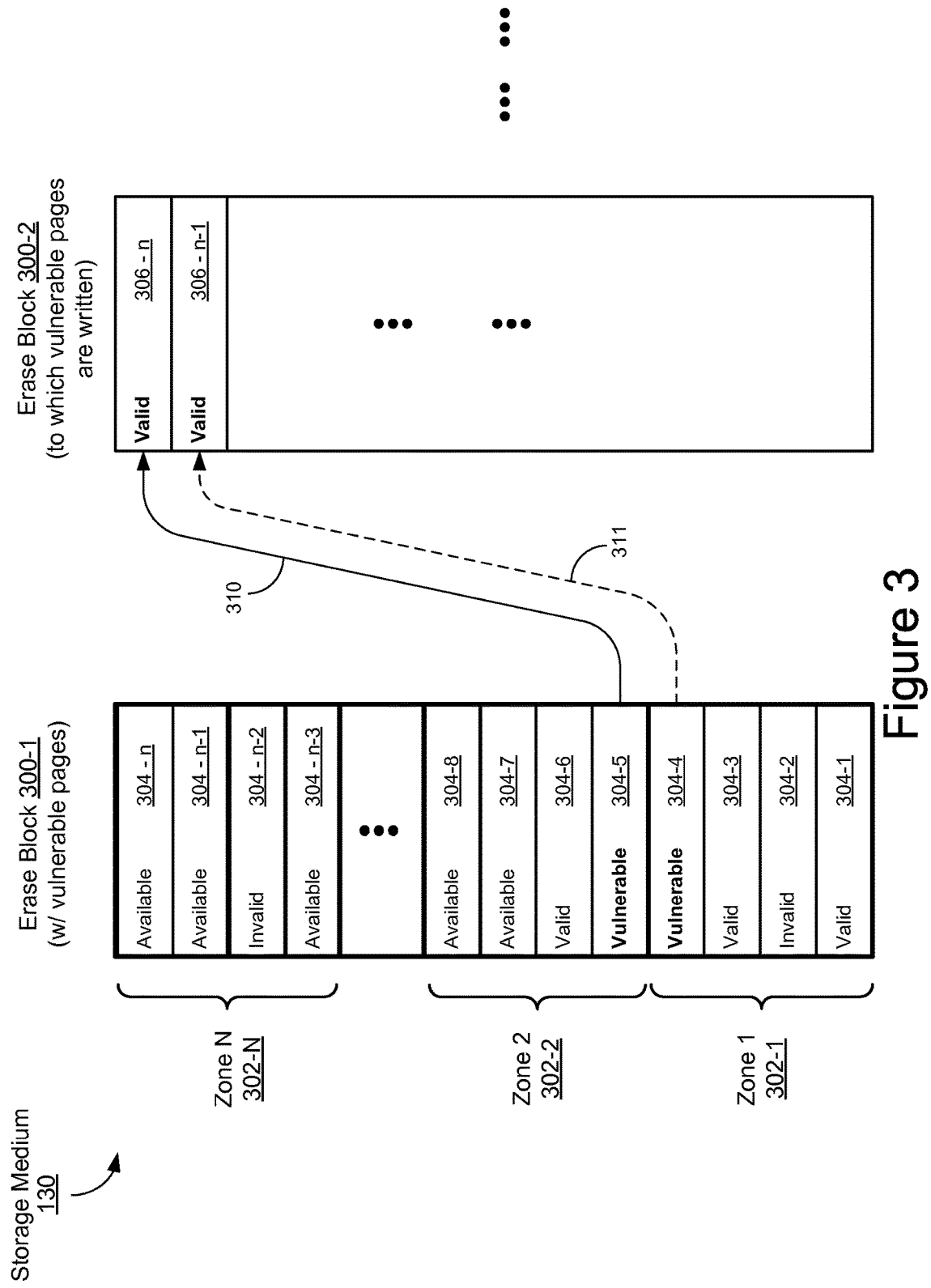
FIG. 3 is a visual representation of garbage collection for a sub-block, in accordance with some embodiments.

FIG. 3 is a visual representation of garbage collection for a sub-block, in accordance with some embodiments. While some example features are illustrated, various other features have not been illustrated for the sake of brevity and so as not to obscure more pertinent aspects of the example implementations disclosed herein. To that end, as a non-limiting example, storage medium 130 includes erase blocks 300, each having a plurality of pages 304, 306. Furthermore, in some implementations, each erase block 300 includes a plurality of zones 302 (e.g., 302-1 through 302-N), each of which includes a plurality of pages (e.g., zone 302-1 includes pages 304-1 through 304-4).

As shown, each of pages 304, 306 is further designated as valid (e.g., 304-3), invalid (e.g., 304-2), available (e.g., 304-7), or vulnerable (e.g., 304-5). Pages designated valid and pages designated vulnerable both contain valid data, while pages designed invalid pages designated available do not contain valid data. Stated another way, vulnerable pages are a subclass of valid pages. In some embodiments, the above designations apply to sub-blocks. Pages are just one example of sub-blocks.

In FIG. 3, a "Valid" designation indicates that the data of the corresponding page is accurate and valid, whereas an "Invalid" designation indicates that the data of the corresponding page has been modified and/or updated, and there the data in the corresponding page is invalid. Furthermore, an "Available" designation indicates that the corresponding page does not contain stored data, and is available for writing. A page is designated as "Vulnerable" if a trigger parameter of the page (i.e., sub-block) meets a corresponding vulnerability criterion (as described in greater detail with respect to FIG. 8B).

In particular, garbage collection of a first sub-block of a first erase block (e.g., page 304-5 of erase block 300-1) is performed in accordance with a determination that a first trigger parameter (e.g., a read-disturb count) meets a first vulnerability criterion (e.g., a read-disturb threshold). Detailed discussions of trigger parameters and vulnerability criteria are provided below with respect to FIGS. 8A-8C.

As illustrated, performing garbage collection of the first sub-block includes writing (310) a copy of the data of the first sub-block into an available page of a second erase block (e.g., writing the data of page 304-5 into page 306-n of erase block 300-2). In some implementations, after copying the data of the first sub-block, the first sub-block (e.g., page 304-5) in the first erase block is invalidated (not shown), and the new sub-block (e.g., page 306-n) of the second erase block which includes the copied data is designated as valid.

Figure 8A:
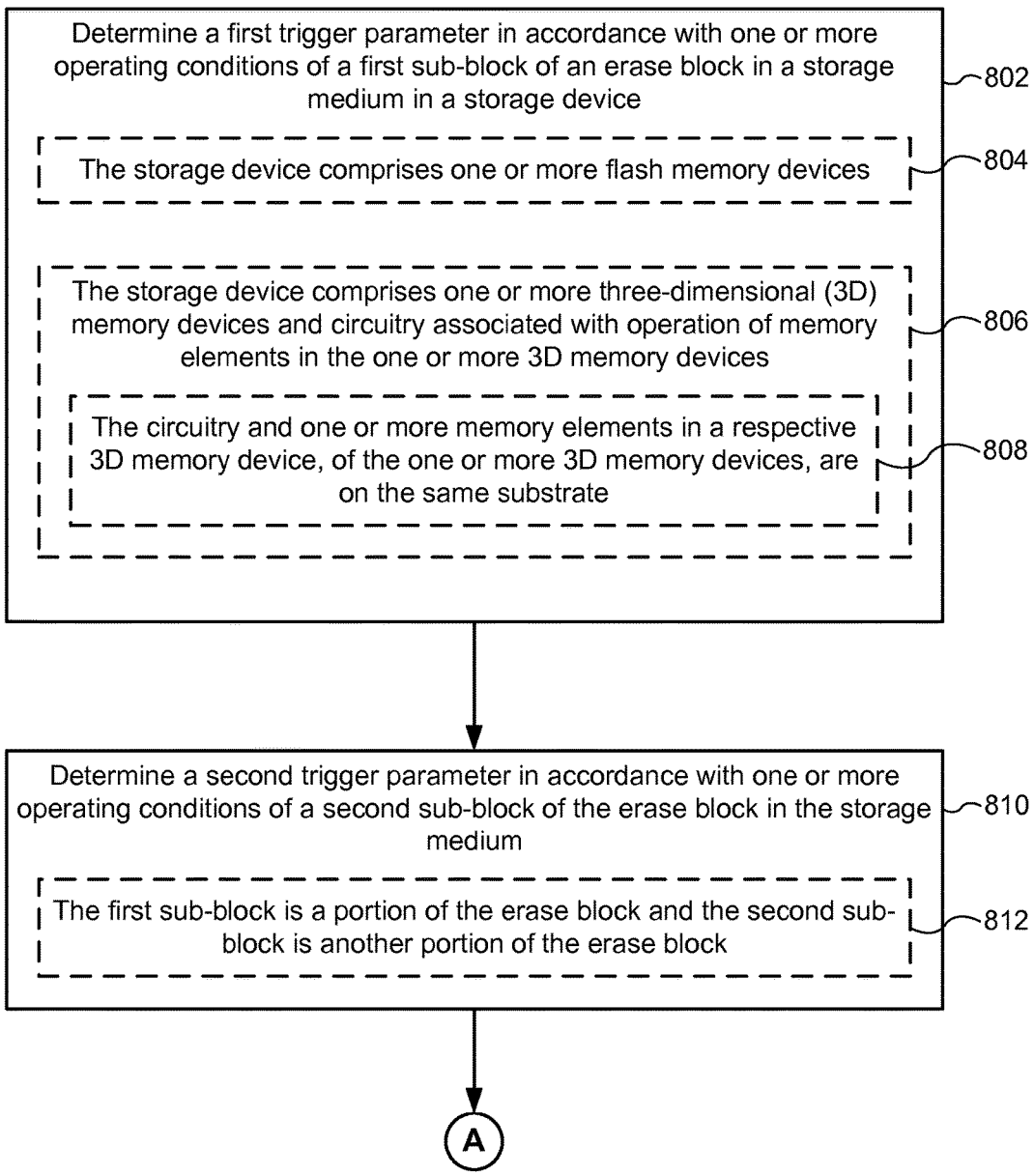
FIGS. 8A-8C illustrate a flowchart representation of a method of garbage collection for a storage medium in a storage system, in accordance with some embodiments.
Figure 8B:
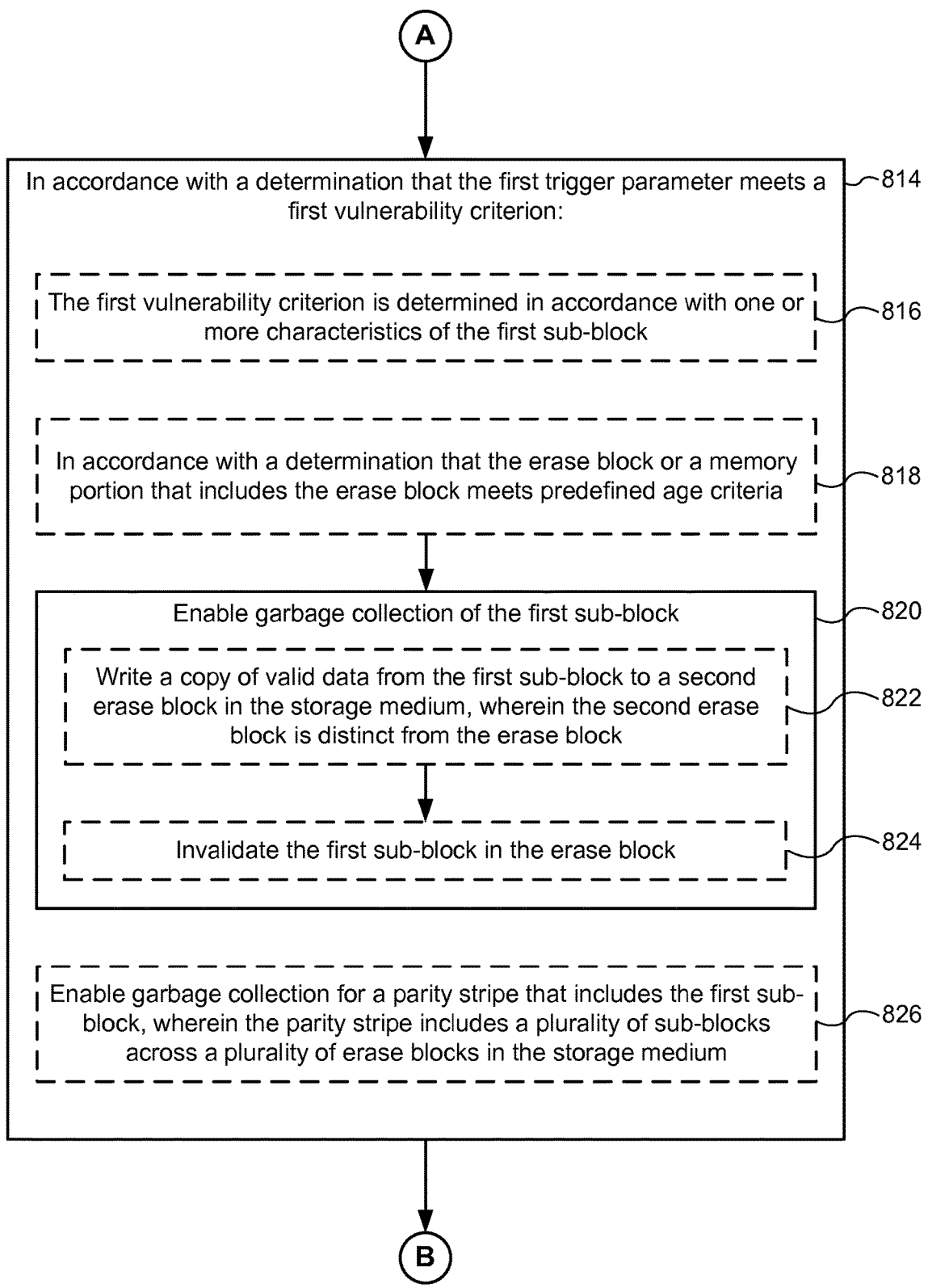
Figure 8C:
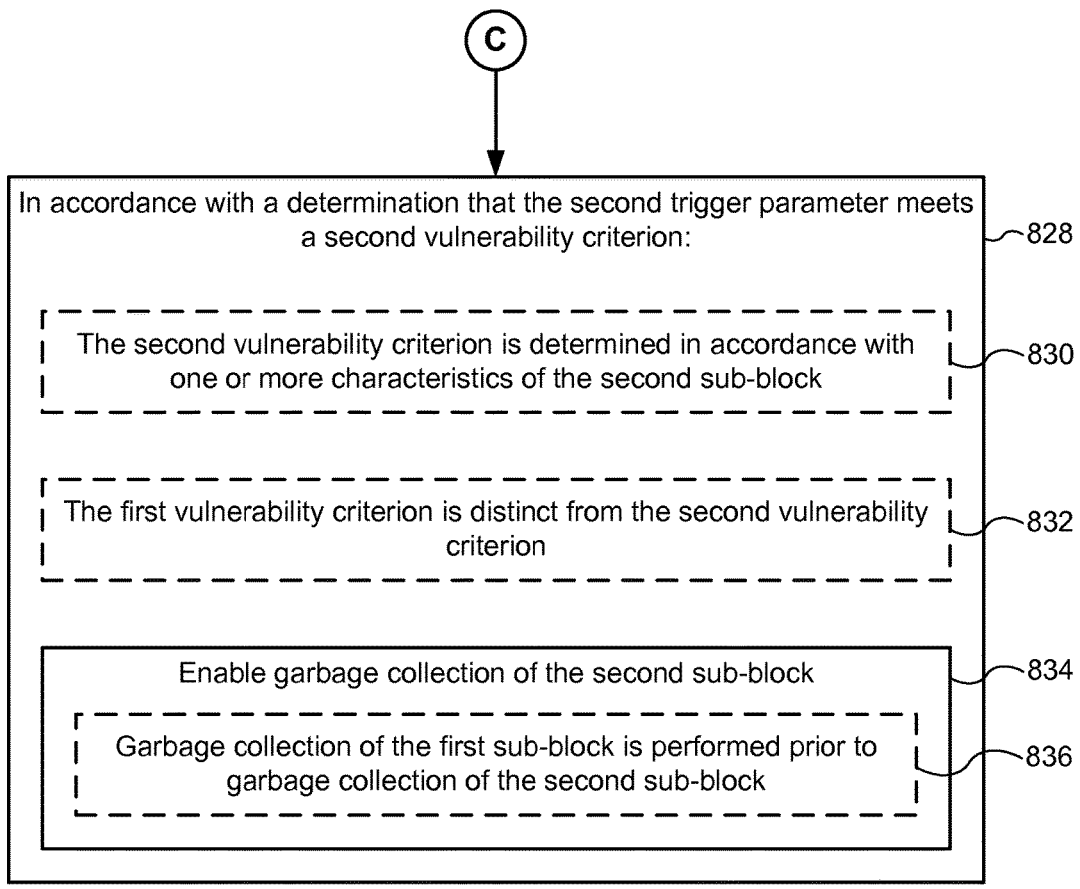

Optionally, as described in greater detail with respect to FIG. 8C, garbage collection of a second sub-block of a first erase block (e.g., page 304-4 of erase block 300-1) is performed (311) in accordance with a determination that a second trigger parameter (e.g., a read-disturb count) meets a second vulnerability criterion (e.g., a read-disturb threshold). Garbage collection of the second sub-block, in some implementations, is performed after garbage collection of the first sub-block.

In a variation of the scheme shown in FIG. 3, the zones 302 are the sub-blocks, of erase block 300, and each zone 302 includes multiple pages. Further, individual pages 304 are designated valid, invalid or available, while sub-blocks are designed as vulnerable or not vulnerable. Thus, in this variation, pages are not designated as vulnerable. Furthermore, when a sub-block (i.e., zone) that has been designated as vulnerable is garbage collected, all valid pages in the sub-block are copied to a different erase block than the erase block that contains the sub-block. After the copying (i.e., garbage collection of the sub-block), the copied pages in the vulnerable sub-block are designated invalid, and the new copies of those pages are used if a read command to read data in any of those page is received.

In yet another variation, each zone 302 includes a plurality of sub-blocks, and each sub-block includes a plurality of pages. This is similar to the scheme shown in FIG. 3, except that the sub-blocks are bigger than individual pages. In one example of this scheme, each sub-block contains all the pages in one or more word lines, and each zone includes at least one sub-block, while at least one zone in the block includes a plurality of sub-blocks. In one example, a block contains four or more zones, with top and bottom zones, farthest and closest to the substrate, that each contain a single sub-block, and two or more middle zones, each of which contains a plurality of sub-blocks. In another example, a block contains at least three zones, each having a distinct contiguous set of word lines in the block. In this example, each zone has its own vulnerability criterion (e.g., a different read count threshold, applied on a per-sub-block basis). In some implementations, by keeping the number of sub-blocks per block small (e.g., four or less), the number of distinct trigger parameters (e.g., read counts) that need to be maintained is kept reasonably small and manageable.

Furthermore, in some implementations, one or more sub-blocks in a block are of different size than other sub-blocks in the same block. For example, a particularly vulnerable page or word line can be its own sub-block, while other sub-blocks of the same block contain multiple pages or word lines and thus are multiple times as large as the sub-block that is particularly vulnerable. In another example of sub-blocks having different sizes and different vulnerability criterions, one sub-block can be a subset of another, larger sub-block, with the smaller sub-block having a distinct vulnerability criterion than the larger sub-block. In this way, the smaller sub-block can be configured to protect data in a particularly vulnerable portion of a block by assigning it a different vulnerability criterion (e.g., a smaller read count threshold) than the larger sub-block.

In some implementations, garbage collecting only a sub-block of an erase block (and, optionally, garbage collecting the entire erase block at a later time) reduces the impact of garbage collection on the endurance of a storage medium. In particular, the data integrity of vulnerable sub-blocks is maintained without further wearing the storage medium.

Figure 4A:
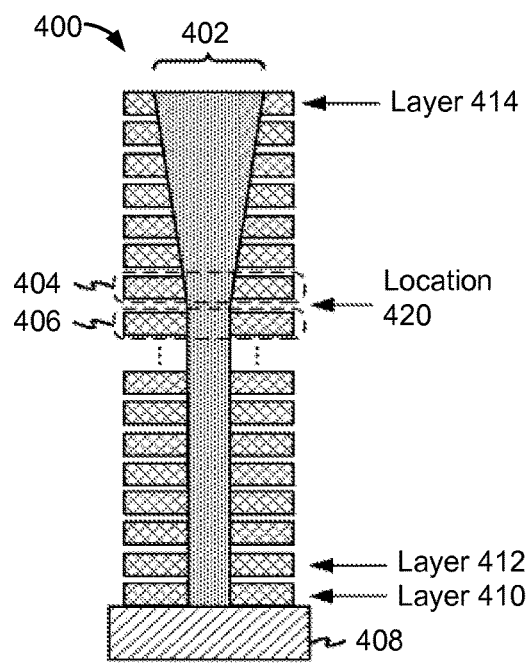
FIG. 4A is a schematic diagram of a column of a three-dimensional (3D) memory device in accordance with some embodiments.

FIG. 4A is a schematic diagram of a column 400 of a memory device (e.g., storage medium 130, FIG. 1) in accordance with some embodiments. Column 400 is integrated within a memory device having a three-dimensional (3D) memory configuration. For example, column 400 is integrated within the storage medium 130 of FIG. 1.

In some embodiments, column 400 includes storage elements (e.g., SLC or MLC flash memory cells) formed within multiple layers of materials that are formed on a substrate 408 (e.g., a silicon substrate). To illustrate, FIG. 4A shows representative layers 410, 412, and 414. For example, layer 410 is formed adjacent to substrate 408 (i.e., layer 410 is a "bottom" layer). Further in this example, layer 412 is adjacent to layer 410, and layer 414 is farther from the substrate than other layers of column 400 (i.e., layer 414 is a "top" layer). In some embodiments, layers 410, 412, and 414 include a conductive (or semiconductive) material (e.g., doped polysilicon). In some embodiments, column 400 includes other layers, such as an oxide layer interposed between layers 410 and 412.

In some embodiments, column 400 further includes a structure 402. To form structure 402, an etch process is performed to etch through layers of column 400 to form an etched region (e.g., a cavity, such as a "memory hole"). After etching through layers of column 400 to form the etched region, the etched region is filled with one or more materials to form structure 402. For example, structure 402 has a circular or substantially circular shape. In this example, a cross section of structure 402 that is perpendicular to a surface of substrate 408 is circular.

In some embodiments, column 400 includes multiple storage elements, such as representative storage elements 404 and 406 (e.g., SLC or MLC flash memory cells). For example, storage element 404 is included in a first physical page of a first word line of storage medium 130 in FIG. 1, and the storage element 406 is included in a second physical page of a second word line of storage medium 130 in FIG. 1. Storage elements 404 and 406 are connected to structure 402.

In some embodiments, structure 402 has a variation. For example, as illustrated in FIG. 4A, structure 402 has a "conical" or "tapered" profile. Location 420 indicates a region of structure 402 associated with tapering of structure 402. For example, in FIG. 4A, structure 402 is not tapered below location 420 (i.e., nearer to substrate 408 than location 420), and structure 402 is tapered above location 420 (i.e., farther from substrate 408 than location 420). In FIG. 4A, for example, location 420 is between storage elements 404 and 406 because structure 402 begins "tapering" approximately between storage elements 404 and 406.

By identifying location 420, accuracy of operations at storage medium 130 can be improved. For example, by identifying location 420, storage elements 404 and 406 may be associated with different ECC parameters and/or different memory access parameters to compensate for differences in physical characteristics of storage elements 404 and 406 due to tapering of structure 402. Differences in physical characteristics of storage elements are described further with reference to FIG. 4B.

Figure 4B:
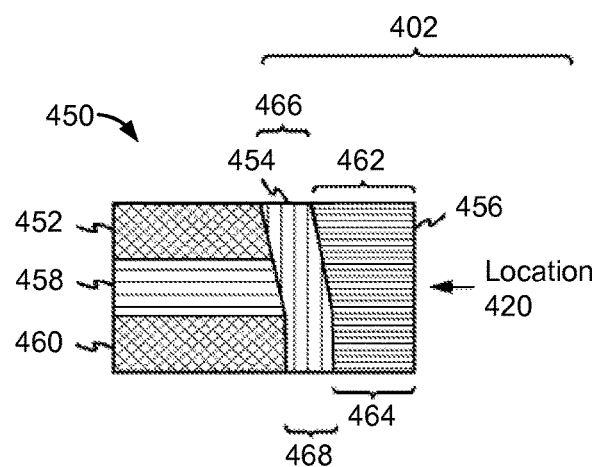
FIG. 4B is a schematic diagram of a portion of the column in FIG. 4A in accordance with some embodiments.

FIG. 4B is a schematic diagram of a portion 450 of column 400 in accordance with some embodiments. In accordance with some embodiments, portion 450 illustrates a charge trap structure 454 and a conductive channel 456 formed within structure 402. In FIG. 4B, control gate 452 and a control gate 460 are connected to charge trap structure 454. For example, control gate 452 is included in storage element 404 of FIG. 4A, and control gate 460 is included in storage element 406 of FIG. 4A. In some embodiments, control gates 452 and 460 are separated by a material, such as an oxide region 458.

In some embodiments, control gates 452 and 460 and oxide region 458 are formed within multiple layers of storage medium 130. For example, control gate 452 is formed within a polysilicon layer, oxide region 458 is formed within an oxide layer, and control gate 460 is formed within another polysilicon layer. In some embodiments, control gates 452 and 460 and oxide region 458 are formed within one or more "physical layers" of storage medium 130. For example, a physical layer includes control gate 452 and oxide region 458.

It should be appreciated that one or more additional materials may be formed within structure 402. For example, charge trap structure 454 is separated from control gate 452 and conductive channel 456 by a gate dielectric, such as a silicon oxide. In some embodiments, charge trap structure 454 includes an insulating material, such as silicon nitride. In some embodiments, conductive channel 456 includes a conductive material, such as a metal (e.g., copper).

In some embodiments, portion 450 is biased to write a value to storage element 404 and to sense a value stored at storage element 404. In some embodiments, portion 450 is biased to write a value to storage element 406 and to sense a value stored at storage element 406. For example, charge is injected into or drained from charge trap structure 454 by biasing control gate 452 relative to conductive channel 456. In this example, the amount of charge in charge trap structure 454 affects the amount of current through conductive channel 456 during a read operation of storage element 404 and indicates one or more bit values stored in storage element 404. As another example, charge is injected into or drained from charge trap structure 454 by biasing control gate 460 relative to conductive channel 456. In this example, the amount of charge in charge trap structure 454 affects the amount of current through conductive channel 456 during a read operation of storage element 406 and indicates a state of storage element 406. The state of storage element 406 corresponds to one or more bit values stored by storage element 406.

FIG. 4B illustrates a variation (or "tapering") associated with structure 402. The variation corresponds to a difference between a first width of structure 402 at a first distance from substrate 408 and a second width of structure 402 at a second distance from substrate 408, where the second distance is greater than the first distance. To further illustrate, FIG. 4B illustrates that a variation associated with structure 402 affects channel width 462 (e.g., a radius of the channel) that is associated with control gate 452. FIG. 4B further shows that channel width 464 (e.g., a radius of the channel) associated with control gate 460 may be less than channel width 462 due to tapering of structure 402. Because channel width 464 is greater than channel width 462, operation of storage element 404 (FIG. 4A) may differ from operation of the storage element 406 (FIG. 4A). For example, because the width of conductive channel 456 affects the amount of current conducted by structure 402, the difference between channel widths 462 and 464 affects operation of a memory device that includes portion 450. Accordingly, biasing control gate 452 with a voltage causes conductive channel 456 to conduct less current as compared to applying voltage to control gate 460.

Alternatively or additionally, in accordance with some embodiments, a variation of structure 402 causes gate-to-channel distance 466 associated with storage element 404 to be greater than gate-to-channel distance 468 associated with storage element 406. In this case, charge trap structure 454 has a greater taper effect than conductive channel 456. During a write operation that programs a state of storage element 404, a greater voltage (relative to storage element 406) is applied to control gate 452 to accumulate charge within charge trap structure 454 (e.g., by drawing electrons from conductive channel 456 to within charge trap structure 454). Therefore, tapering of structure 402 causes programming operations of storage element 404 to differ relative to storage element 406, which can result in an "incorrect" state being programmed to and/or sensed from storage element 404. The tapering of structure 402 also makes storage element 406 more vulnerable to read disturbs than storage element 404. Thus, a vulnerability criterion of sub-blocks for enabling garbage collection (as described in greater detail below with respect to FIGS. 8A-8C) will vary in relation to the distance of the sub-block from the substrate.

FIG. 4B illustrates that a variation (e.g., tapering) of a structure (e.g., the structure 402) extending through multiple layers of a memory device (e.g., storage medium 130, FIG. 1) affects read and write operations associated with the memory device. In some embodiments, performance of a memory device that includes portion 450 is improved by using different ECC strengths (or techniques) and/or memory access techniques (e.g., programming parameters) for storage elements 404 and 406. For example, because a variation of structure 402 occurs at location 420, a first ECC technique and/or a first memory access technique is associated with storage element 406, and a second ECC technique and/or a second memory access technique is associated with storage element 404 to improve operation of the memory device (e.g., storage medium 130, FIG. 1). For example, the second ECC technique compensates for a greater number of errors occurring at storage element 404 as compared to storage element 406 due to "tapering" of structure 402. For example, the second ECC technique has a higher error correction capability than the first ECC technique, which may improve error correction. For example, the second memory access technique compensates for a greater number of write errors and/or read errors that may occur at storage element 404 as compared to storage element 406 due to "tapering" of structure 402. For example, second memory access technique programs storage element 404 using a different programming voltage (as compared to first memory access technique) in order to program storage element 404 to the "correct" state. As another example, second memory access technique senses storage element 404 using a different read voltage (as compared to the first memory access technique) in order to read storage element 404 at the "correct" threshold voltage (e.g., to compensate for reduced effectiveness of programming operations at storage element 404 caused by tapering of structure 402). As described further herein ECC techniques and/or memory access techniques can be selectively applied to physical pages of a block based on a location of a variation of structure 402.

Figure 5:
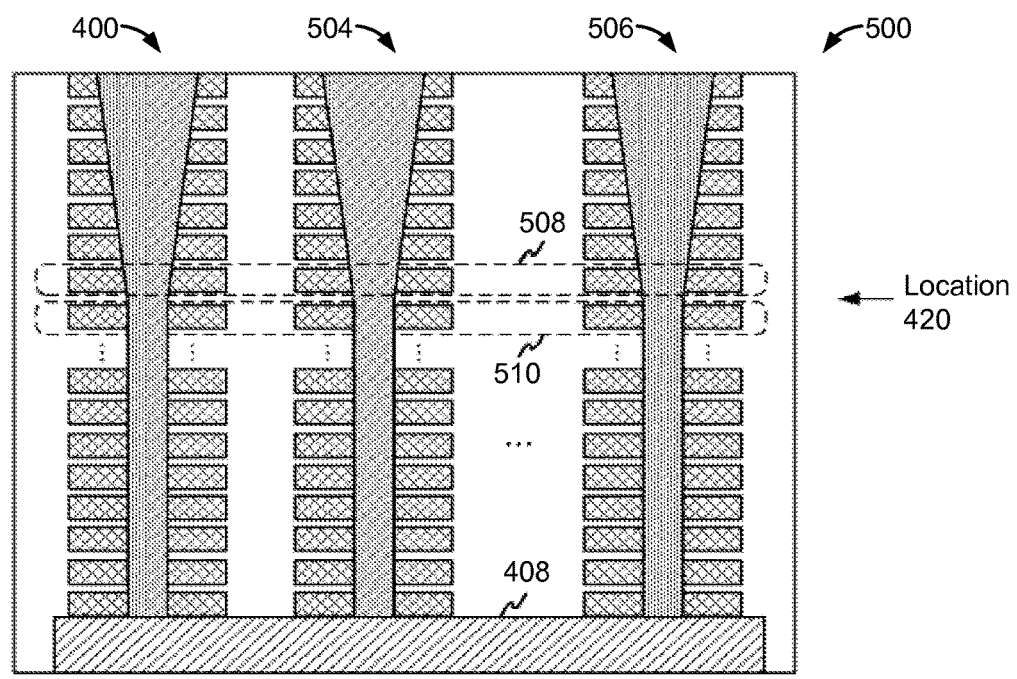
FIG. 5 is a schematic diagram of a block of a 3D memory device in accordance with some embodiments.

FIG. 5 is a schematic diagram of a block 500 (e.g., an erase block of storage elements) in accordance with some embodiments. For example, block 500 is included in the storage medium 130 in FIG. 1. In FIG. 5, block 500 includes at least includes physical pages 508 and 510 and further includes column 400 from FIG. 4A.

In FIG. 5, block 500 includes columns 504 and 506 in addition to column 400. In FIG. 5, columns 400, 504, and 506 are formed upon substrate 408. Columns 400, 504, and 506 include a plurality of physical pages (e.g., word lines of storage elements) formed within the plurality of layers of storage medium 130 (FIG. 1). For example, physical pages 508 and 510 are formed within the layers of block 500. Each physical page of the block 500 includes multiple storage elements. As an example, storage element 404 of FIG. 4A is formed within physical page 508, and storage element 406 of FIG. 4A is formed within physical page 510. As described above, a sub-block includes one or more selectable portions 131 (e.g., pages or word lines) of a storage medium. Furthermore, a group of word lines (e.g., two or more contiguous word lines in column 506 of block 500) comprise a zone.

In FIG. 5, a variation (e.g., tapering) occurs in the structure of each of columns 400, 504, and 506. It should be appreciated that, depending on the particular fabrication process, a block may include one or more columns with structures that do not include (or that do not substantially include) a variation. In FIG. 5, the variation within each of columns 400, 504, and 506 occurs at (or approximately at) location 420. In some embodiments, it should be appreciated that variations within each of columns 400, 504, and 506 occur at different locations (e.g., at different heights above the substrate 408).

FIG. 5 illustrates that a location (e.g., location 420) of a variation of a structure may occur between (or approximately between) physical pages of a block (e.g., block 500). In some embodiments, storage controller 124 applies techniques for encoding, writing, reading, and decoding data from a physical page of block 500 based on a location of the physical page relative to location 420. As described further with reference to FIG. 6, in some embodiments, location 420 defines multiple levels (or groups of layers) of a three-dimensional (3D) memory.

Figure 6:
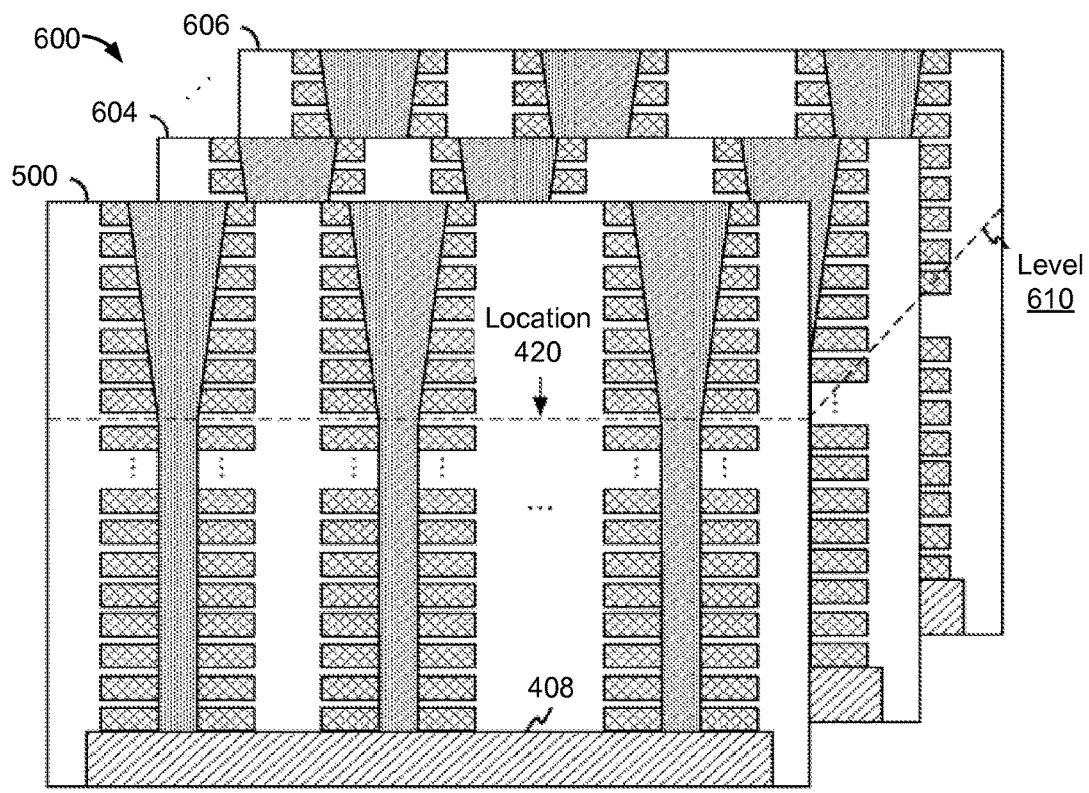
FIG. 6 is a schematic diagram of a 3D memory device in accordance with some embodiments.

FIG. 6 is a schematic diagram of a three-dimensional (3D) memory device 600 in accordance with some embodiments.

For example, 3D memory device 600 is included in storage medium 130 (FIG. 1). In FIG. 6, 3D memory device 600 includes block 500 of FIG. 5 and further includes blocks 604 and 606. In some embodiments, each of the blocks 500, 604, and 606 are formed upon substrate 408.

In FIG. 6, location 420 defines a level 610. In accordance with some embodiments, level 610 "partitions" 3D memory device 600 into multiple levels (e.g., a "bottom" level that is adjacent to substrate 408 and a "top" level that is non-adjacent to substrate 408). For example, level 610 defines a plane that intersects each of blocks 500, 604, and 606 at a level k, where k is a positive integer indicating a distance between substrate 408 and location 420. In some embodiments, level k indicates a number of physical pages or a number of word lines of 3D memory device 600 between substrate 408 and location 420.

In some embodiments, level 610 intersects each of blocks 500, 604, and 606 at a common level k. Alternatively, in some embodiments, depending on the particular fabrication process used to fabricate 3D memory device 600, level 610 intersects two or more of blocks 500, 604, and 606 at different locations. As an example, level 610 intersects block 500 at a first distance from substrate 408, intersects block 604 at a second distance from substrate 408, and intersects block 606 at a third distance from substrate 408. In this example, level 610 corresponds to a "non-uniform" plane, such as an inclined plane.

In some embodiments, storage controller 124 or a component thereof (e.g., location determination module 218, FIG. 2) determines a variation location (e.g., the end of a taper region such as location 420 in FIGS. 4A-4B and 5-6) for each column or block of storage medium 130 and stores the resulting locations in location table 220. For example, with reference to FIG. 4A, location determination module 218 determines location 420 for column 400 by comparing programming parameters required to program a same state to memory elements (or memory cells) in different word lines with different vertical positions relative to the substrate of storage medium 130 (e.g., memory elements 404 and 406) during a setup or testing process. For example, a first page included in a first word line that require more intense programming parameters (e.g., programming voltage, number of programming pulses, and/or duration of programming pulses) to program memory cells in the first page with a respective state as compared to the programming parameters required to program memory cells of a second page in a second word line with the same respective state. Continuing with this example, location determination module 218 may determine that the variation location is located between the first and second word lines due to the tapering effect of the memory device causing the difference in programming parameters required to program the same respective state. For further discussion of determining the variation location, see U.S. patent application Ser. No. 14/273,031, filed May 8, 2014, entitled "Structure Variation Detection for a Memory Having a Three-Dimensional Memory Configuration," which is incorporated herein by reference in its entirety.

In some embodiments, location determination module 218 determines the variation location for each column or block of storage medium 130 upon the first power-on of storage medium 130. In some embodiments, storage controller 124 or a component thereof (e.g., location update module 219, FIG. 2) determines an updated variation location for each column or block of storage medium 130 and overwrites the previous locations in location table 220 with the resulting updated locations. For example, location update module 219 determines updated variation locations for each column or block of storage medium 130 in accordance with a predefined schedule such as every X power cycles of storage medium 130.

In some embodiments, location table 220 stores a determined location 420 for each block of storage medium 130 indicating the end of a taper region for columns within a respective block. For example, for the respective block, determined location 420 indicates a page or word line at which the taper region ends relative to the substrate. In some embodiments, location table 220 stores a determined location 420 for each column of storage medium 130 indicating the end of a taper region for a respective column. For example, for the respective column, determined location 420 indicates a page or word line at which the taper region ends relative to the substrate. As such, in some embodiments, storage controller 124 is able to selectively encode, write, read, and/or decode data from pages or word lines above and below determined location 420 for the respective column. For example, for the respective column, data written to pages or word lines above determined location 420 are encoded with a first ECC technique, and data written to pages or word lines below determined location 420 are encoded with a second ECC technique.

Figure 7:
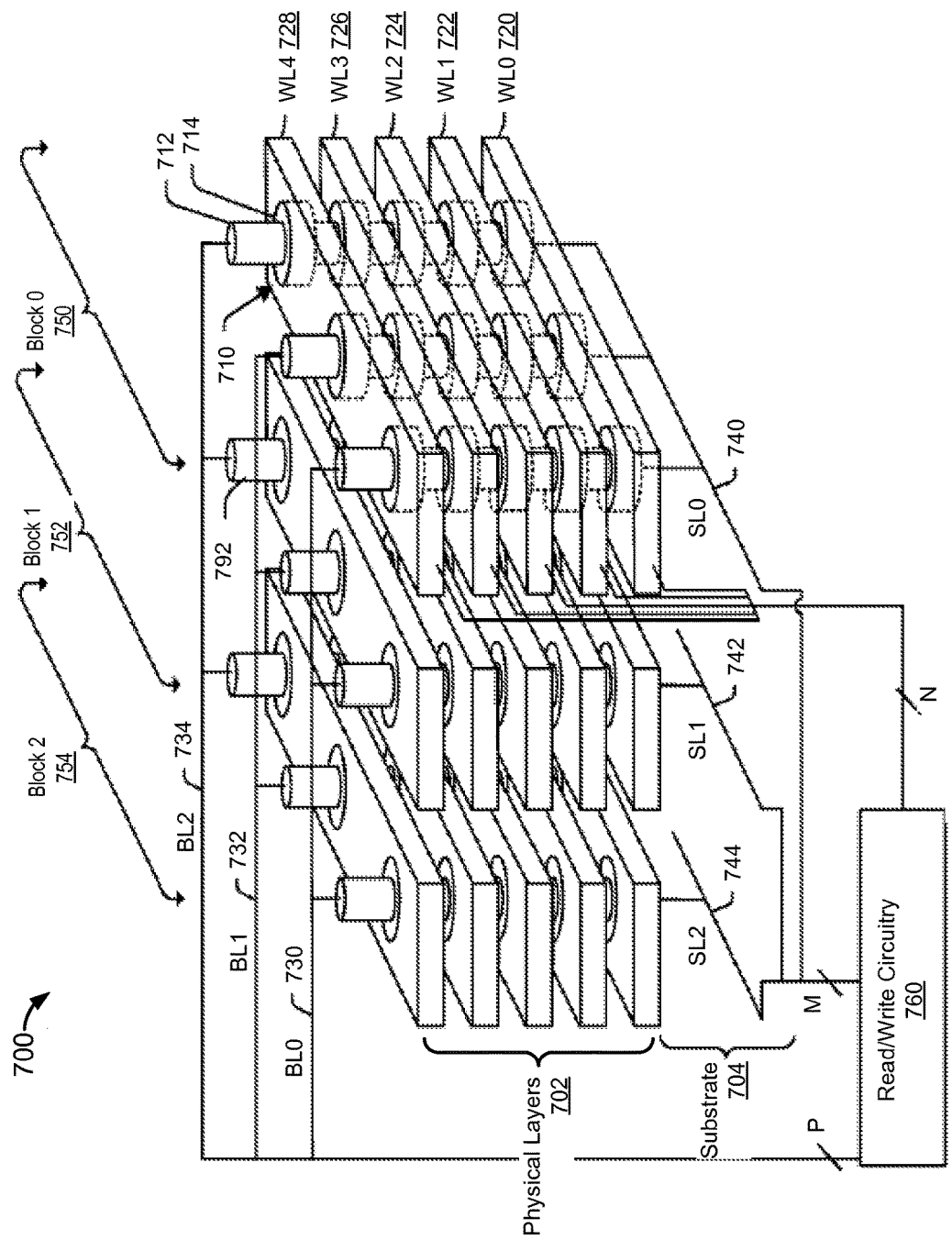
FIG. 7 is a schematic diagram of a 3D memory device in a NAND flash configuration in accordance with some embodiments.

FIG. 7 is a schematic diagram of a 3D memory device 700 in a NAND flash configuration in accordance with some embodiments. For example, 3D memory device 700 corresponds to storage medium 130 (FIG. 1). In FIG. 7, 3D memory device 700 includes a plurality of physical layers 702, each with a plurality of storage elements (e.g., memory cells), such as a representative memory cell 710. In some embodiments, the storage elements are arranged in arrays within physical layers 702.

In FIG. 7, representative memory cell 710 includes a charge trap structure 714 between word line/control gate (WL4) 728 and conductive channel 712. Charge is injected into or drained from charge trap structure 714 by biasing conductive channel 712 relative to word line 728. For example, charge trap structure 714 includes silicon nitride and is separated from word line 728 and conductive channel 712 by a gate dielectric (e.g., silicon oxide). In some embodiments, the amount of charge in charge trap structure 714 affects the amount of current through conductive channel 712 during a read operation of memory cell 710 and indicates one or more bit values that are stored in memory cell 710.

In some embodiments, 3D memory device 700 includes multiple erase blocks, including a first block (block 0) 750, a second block (block 1) 752, and a third block (block 2) 754. In FIG. 7, block 750-754 each include a "vertical slice" of physical layers 702 that includes a stack of word lines, illustrated as a first word line (WL0) 720, a second word line (WL1) 722, a third word line (WL2) 724, a fourth word line (WL3) 726, and fifth word line (WL4) 728. Multiple conductive channels (having a substantially vertical orientation with respect to FIG. 7) extend through the stack of word lines. Each conductive channel is coupled with a storage element in each of word lines 720-728, forming a NAND string of storage elements. FIG. 7 illustrates three blocks 750-754, five word lines 720-728 in each block, and three conductive channels in each block for clarity of illustration. However, in some embodiments, 3D memory device 700 includes more than three blocks, more than five word lines per block, and more than three conductive channels per block. Furthermore, in some embodiments, a single block includes all the word lines in multiple vertical slices (e.g., two or four vertical slices) of physical layers 702.

In some embodiments, read/write circuitry 760 (i.e., read/write circuitry 135 or alternatively read/write circuitry within storage medium I/O 128) is coupled with conductive channels via multiple conductive lines, illustrated as a first bit line (BL0) 730, a second bit line (BL1) 732, and a third bit line (BL2) 734 at a "top" end of the conducive channels (e.g., relative to substrate 704) and a first source line (SL0) 740, a second source line (SL1) 742, and a third source line (SL2) 744) at a "bottom" end of the conductive channels (e.g., relative to substrate 704). In FIG. 7, read/write circuitry 760 is coupled with bit lines 730-734 via "P" control lines, coupled with source lines 740-744 via "M" control lines, and coupled with word lines 720-728 via "N" control lines. In some embodiments, each of P, M, and N are a positive integer value based on the specific configuration of 3D memory device 700. In FIG. 7, P=3, M=3, and N=5.

In some embodiments, each of bit lines 730-734 and each of source lines 740-744 are coupled with the same end (e.g., the top end or the bottom end) of different conductive channels. For example, a respective bit line is coupled with the top of conductive channel 792 and a respective source line is coupled with the top of conductive channel 712. Continuing with this example, the bottom of conductive channel 792 is coupled (e.g., electrically coupled) to the bottom of conductive channel 712. Accordingly, in this example, conductive channel 792 and conductive channel 712 are coupled in series and are coupled with the respective bit line and the respective source line.

Although each of the conductive channels (e.g., conductive channels 712, 792) in FIG. 7 is illustrated as a single conductive channel, in some embodiments, each of the conductive channels include multiple conductive channels that are in a stacked configuration. For example, the multiple conductive channels in a stacked configuration may be coupled by one or more connectors. For further discussion of 3D memory devices with multiple conductive channels in a stacked configuration, see U.S. patent application Ser. No. 14/272,363, filed May 8, 2014, entitled "Three-Dimensional Memory Device Having Stacked Conductive Channels," which is incorporated herein by reference in its entirety.

In some embodiments, read/write circuitry 760 receives memory operation commands from storage controller 124 (e.g., a read command from data read module 212, a write command from data write module 214, or an erase command from data erase module 216). For example, data is stored in storage elements coupled with word line 728 and read/write circuitry 760 reads bit values from these storage elements. As another example, the read/write circuitry 760 applies selection signals to control lines coupled with word lines 720-728, bit lines 730-734, and source lines 740-742 to cause a programming voltage (e.g., a voltage pulse or series of voltage pulses associated with a threshold voltage) to be applied across selected storage element(s) of the selected word line (e.g., fourth word line 728) so as to write/program data to the selected storage element(s).

For example, during a read operation, storage controller 124 receives a request from the host (e.g., computer system 110, FIG. 1) and, in response, causes read/write circuitry 760 to read bits from particular storage elements of 3D memory device 700 by applying appropriate signals to control lines to cause storage elements of a selected word line to be sensed.

FIGS. 8A-8C illustrate a flowchart representation of a method 800 of garbage collection for a storage medium in a storage system, in accordance with some embodiments. As noted above with respect to FIG. 1, since erasure of a storage medium is performed on a block basis, but in many embodiments programming of the storage medium is performed on a smaller subunit of a block (e.g., on a page basis), pages with invalid data cannot be overwritten until the whole block containing those pages is erased. The storage device (e.g., storage device 120, FIG. 1) uses garbage collection to reclaim portions of memory (e.g., storage medium 130, FIG. 1) that no longer contain valid data. To reduce the impact of garbage collection on the endurance of a storage medium, however, the storage device (e.g., storage device 120, FIG. 1) first garbage collects only vulnerable sub-blocks of a block (i.e., writes copies of the vulnerable sub-blocks to a different block, and invalidates the data in the vulnerable sub-blocks), while withholding garbage collection of the remainder of the block until a separate decision is made to garbage collect the block itself. In some circumstances, the remainder of the block is not garbage collected if it never meets the criteria for garbage collection.

At least in some embodiments, method 800 is performed by a storage device (e.g., storage device 120, FIG. 1) or one or more components of the storage device (e.g., storage controller 124 and/or storage medium 130, FIG. 1), wherein the storage device is operatively coupled with a host system (e.g., computer system 110, FIG. 1). In some embodiments, method 800 is governed by instructions that are stored in a non-transitory computer readable storage medium and that are executed by one or more processors of a device, such as the one or more processing units (CPUs) 122 of management module 121, shown in FIGS. 1 and 2. In some embodiments, method 800 is performed by a storage system (e.g., data storage system 100, FIG. 1) or one or more components of the storage system (e.g., computer system 110 and/or storage device 120, FIG. 1). In some embodiments, some of the operations of method 800 are performed at a host (e.g., computer system 110, FIG. 1) and information is transmitted to a storage device (e.g., storage device 120, FIG. 1). In some embodiments, method 800 is governed, at least in part, by instructions that are stored in a non-transitory computer readable storage medium and that are executed by one or more processors of a host (not shown in FIG. 1). For ease of explanation, the following describes method 800 as performed by a storage device (e.g., storage device 120, FIG. 1). However, those skilled in the art will appreciate that in other embodiments, one or more of the operations described in method 800 are performed by a host (e.g., computer system 110, FIG. 1).

A storage device (e.g., storage device 120, FIG. 1) determines (802) a first trigger parameter in accordance with one or more operating conditions of a first sub-block of an erase block in a storage medium in the storage device. Examples of operating conditions are read operations, or the number of read operations performed in a particular portion of the storage medium. Read operations degrade data retention by the storage device by disturbing adjacent or nearby memory cells. Write operations and erase operations can also degrade data retention. Data retention, sometimes referred to as charge retention on floating gates, is reflected in the ability of a memory cell to produce accurate data values when a read operation is performed. Examples of data retention metrics include metrics related to the detection or measurement of drifting cell threshold voltages and metrics related to the detection or measurement of data errors during read operations (e.g., bit error rate).

Trigger parameters determined in accordance with one or more operating conditions at least partially serve to identify "weak" sub-blocks, which are more likely than other sub-blocks to suffer reduced or impaired data retention, and which are candidates for garbage collection, as described herein. As described in greater detail above with respect to FIGS. 1 and 3-7, sub-blocks can include one or more selectable portions of a storage medium, and are smaller than blocks, which are the smallest unit of storage in the storage medium that can be erased in a single erase operation.

In some embodiments, the first trigger parameter is a read-disturb count of the first sub-block. For example, as previously described, performing a read operation of a respective page disturbs adjacent pages, and therefore increases a read-disturb count of the sub-block(s) containing those adjacent pages. In some implementations, a read-disturb count is maintained by the storage device for each sub-block. For example, in some implementations, performing a read operation of a page of a respective sub-block (e.g., zone 302-1, FIG. 3) increments a read-disturb count of the respective sub-block. Additionally or alternatively, performing a read operation of a page of a respective sub-block (e.g., zone 302-1, FIG. 3) increments a read-disturb count of both the respective sub-block and any adjacent sub-blocks (e.g., adjacent zone 302-2, FIG. 3), while in alternative implementations, only a read-disturb count of any adjacent sub-blocks is incremented. Furthermore, in some implementations, the amount by which a read-disturb count is incremented for a respective sub-block depends on a physical distance between the respective sub-block and the sub-block in which a disturbing memory operation is being performed. For example, based on FIG. 3, a read operation performed on page 304-4 increments a read-disturb count for page 304-5 by 5, whereas a read-disturb count for page 304-1 is incremented by 1.

In some embodiments, the first trigger parameter is a data retention parameter of the first sub-block, a set of data retention parameters, or a combination of data retention parameters. Data retention parameters include, for example, an error metric corresponding to a number of detected data errors in a sub-block (e.g., a bit error rate), and a stability metric corresponding to one or more threshold voltages (e.g., shifting read, write, and/or erase threshold voltages for the first sub-block). Furthermore, in some implementations, data retention parameters include a program-erase (PE) cycle count (e.g., of an erase block) and/or other information relating to the accumulated wear of a storage medium 130, or a portion thereof (e.g., selectable portion 131, FIG. 1). The aforementioned read-disturb count is another example of a data retention parameter.

As described previously, in some embodiments, the storage device regularly performs background monitoring activities (e.g., with state information module 230, FIG. 2) to determine trigger parameters of a respective sub-block (e.g., read-disturb counts and optionally other data retention parameters, sometimes collectively referred to as "state information"), which are stored in a data table in memory (e.g., state information table 232). For example, state information module 230 executes instructions for tracking a read-disturb count for a sub-block of an erase block by identifying (e.g., using translation table 216) the physical pages to which data is being written, and incrementing a read-disturb count for the sub-block when a read operation is performed on data in the sub-block and/or when a read operation is performed on data in a region adjacent or neighboring (e.g., within a predefined range) the sub-block.

In another example, state information module 230 executes instructions for performing a read patrol operation on a sub-block (e.g., page 304-4, FIG. 3) to determine how much erroneous data (e.g., an error rate) the sub-block is storing, if any. In some implementations, background monitoring activities are performed continuously or according to a pre-defined schedule, for example, performing a read patrol operation after every 20 read operations, or performing a read patrol operation on every page containing valid data a predefined number of times (e.g., once) per predefined unit of time (e.g., N hours, where N is a predefined positive integer between 1 and 24).

Furthermore, in some implementations, background monitoring activities are performed according to a predefined schedule that is set based on information from state information table 230 and/or characterization table 234 (storing characteristics of a sub-block, which are described in greater detail below). For example, a read patrol operation is performed more frequently on a sub-block that has been identified as vulnerable, based on a read-disturb count of the sub-block (e.g., a read-disturb count of the sub-block exceeds a threshold, vulnerability criteria being described in greater detail below), and optionally in combination with the location of the sub-block relative to the substrate of the storage medium (e.g., WL0 720, FIG. 7).

In some embodiments, the storage device includes (804) one or more flash memory devices. Stated another way, in some embodiments the storage device includes a storage medium (e.g., storage medium 130, FIG. 1), and the storage medium includes one or more non-volatile storage devices, such as flash memory devices. In some embodiments, the storage medium (e.g., storage medium 130, FIG. 1) is a single flash memory device, while in other embodiments the storage medium includes a plurality of flash memory devices. For example, in some implementations, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., storage medium 130, FIG. 1) includes NAND-type flash memory or NOR-type flash memory. In other embodiments, the storage medium includes one or more other types of non-volatile storage devices.

In some embodiments, the storage device includes (806) one or more three-dimensional (3D) memory devices and circuitry associated with operation of memory elements in the one or more 3D memory devices. Stated another way, in some embodiments the storage device includes a storage medium (e.g., storage medium 130, FIG. 1), and the storage medium includes one or more 3D memory devices and circuitry associated with operation of memory elements in the one or more 3D memory devices. In some embodiments, the storage medium (e.g., storage medium 130, FIG. 1) is a single 3D memory device, while in other embodiments the storage medium includes a plurality of 3D memory devices.

Furthermore, in some implementations, the circuitry and one or more memory elements in a respective 3D memory device, of the one or more 3D memory devices, are (808) on the same substrate (e.g., a silicon substrate). In some embodiments, the substrate is a wafer on which the material layers of the one or more memory elements are deposited and/or in which the one or more memory elements are formed. In some embodiments, the substrate is a carrier substrate which is attached to the one or more memory elements after they are formed. As a non-limiting example, in some embodiments, the substrate includes a semiconductor such as silicon.

The storage device determines (810) a second trigger parameter in accordance with one or more operating conditions of a second sub-block of the erase block in the storage medium (a detailed discussion of which can be found above with respect to the first trigger parameter).

In some embodiments, the first sub-block is a portion of the erase block and the second sub-block is (812) another portion of the erase block. Thus, in some implementations, the first sub-block and the second sub-block are distinct portions of the same erase block (e.g., in FIG. 3, the first sub-block is page 304-4, and the second sub-block is page 304-5). In some implementations, the first sub-block is a page of a zone of the erase block (e.g., page 304-1 of zone 1), and the second sub-block is the remainder of pages of the zone of the erase block (e.g., pages 304-2 through 304-4 of zone 1). In some implementations, the first sub-block is a page of the erase block (e.g., page 304-1) and the second sub-block is the remainder of pages of the erase block (e.g., pages 304-2 through 304-*n*).

In accordance with a determination that the first trigger parameter meets (814) a first vulnerability criterion, the storage device enables (820) garbage collection of the first sub-block. In some embodiments, vulnerability criteria are one or more pre-defined threshold limits for the trigger parameters described above. In some implementations, if a trigger parameter of a sub-block meets a corresponding vulnerability criterion, the sub-block is designated as vulnerable. In some implementations, for example, the first vulnerability criterion is a threshold on a read-disturb count of the first sub-block (e.g., read-disturb count limit of 100), while in some other implementations, the first vulnerability criterion is a threshold number of data errors detected in the first sub-block by performing a read patrol operation (e.g., eighty erroneous bits in page of size 4K bytes, FIG. 3; noting, however, that the threshold number of data errors will be a function of the ECC strength, and optionally the reliability requirements for the device as well). Furthermore, in some embodiments, the first trigger parameter includes both a read-disturb count and another data retention parameter of the first sub-block, and the first vulnerability criterion includes thresholds for both the read-disturb count and the data retention parameter. For example, once the read-disturb threshold is met, a read patrol operation is performed, and the number of data errors detected is compared with the error threshold. If the number of data errors exceeds the error threshold, the first sub-block is designated as vulnerable and is scheduled for garbage collection.

In other example, a weighted combination of trigger parameters, is compared with a threshold to determine if garbage collection should be enabled for the first sub-block. An example of weighted combination of trigger parameters is:

$$\sum_{i=1}^{N} \alpha_i (\text{trigger\_parameter}_i - threshold_i)$$

where N is the number of trigger parameters (e.g., N=2, 3 or 4), "trigger_parameter$_i$" is the $i^{th}$ trigger parameter, $\alpha_i$ is a weight for the $i^{th}$ trigger parameter, and threshold$_i$ is a threshold or subtractive factor for the $i^{th}$ trigger parameter. In this example, the weighted combination is computed and then compared with a predefined threshold to determine if garbage collection should be enabled for the first sub-block.

In some embodiments, the first vulnerability criterion is determined (816) in accordance with one or more characteristics of the first sub-block. The one or more characteristics are intrinsic qualities of a flash memory device that impact data retention. In some implementations, the first vulnerability criterion is determined in accordance with a physical location of a sub-block (e.g., a distance of between the first sub-block and the substrate of the storage medium). For example, for the reasons explained above with respect to FIG. 7, a sub-block comprising word line 0 (e.g., WL0, 720), adjacent to substrate 704, has a stricter vulnerability criterion compared to a sub-block comprising word line 4 (e.g., WL4, 728), which is positioned farther away from substrate 704 than word line 0 (e.g., a read-disturb threshold of 15,000 for WL0, compared to a read-disturb threshold of 25,000 for WL4).

Furthermore, in some implementations, the first vulnerability criterion is determined in accordance with the zone (of a plurality of zones in an erase block) to which the first sub-block corresponds. For example, in erase block 300-1 (FIG. 3), a sub-block (e.g., 302-1) comprising zone 1 has a stricter vulnerability criterion compared to a sub-block (e.g., 302-2) comprising zone 2 (e.g., a read-disturb threshold of 15,000 for zone 1, compared to a read-disturb threshold of 25,000 for zone 2). Furthermore, in some implementations, the first vulnerability criterion is determined in accordance with a page to which the first sub-block corresponds. For example, in zone 1 of erase block 300-1 (FIG. 3), page 304-1 has a stricter vulnerability criterion compared to page 304-2.

In some embodiments, "enabling garbage collection" of a sub-block is different from the actual garbage collection of the sub-block, which occurs after garbage collection of the sub-block is enabled. In some implementations, enabling garbage collection of a sub-block is implemented by adding the sub-block to a queue or list of sub-blocks scheduled for garbage collection. A garbage collection process executed by the storage device's controller or management module or memory channel controller, performs the actual garbage collection of sub-blocks for which garbage collection has been enabled. Such garbage collection can be deferred in order to execute other memory operations, for example, in accordance with memory operation scheduling criteria implemented by the storage device.

In some embodiments, garbage collection includes writing (822) a copy of valid data from the first sub-block to a second erase block in the storage medium, wherein the second erase block is distinct from the erase block, and invalidating (824) the first sub-block in the erase block (i.e., invalidating any valid data remaining in the first sub-block when the first sub-block is garbage collected). An example of garbage collection is illustrated and described in greater detail with respect to FIG. 3.

Optionally, in some implementations, the storage device enables garbage collection of the first sub-block in accordance with a determination that the erase block or a memory portion that includes the erase block meets predefined age criteria (818) and a determination that the first trigger parameter meets the first vulnerability criterion (see 814). In some implementations, age criteria include one or more threshold limits on a program-erase (PE) cycle count, an age (e.g., determined with reference to a date of manufacture for the storage device), and/or other age-related metrics for an erase block, or a memory portion that includes the erase block. As a non-limiting example, garbage collection of page 304-4 (FIG. 3) is enabled if page 304-4 has a read-disturb count that exceeds a threshold of 25,000, and erase block 300-1 (which includes page 304-4) has a PE cycle count that exceeds 2500, where a "PE cycle count that exceeds 2500" is an example of the aforementioned "predefined age criteria."

In some embodiments, the storage device enables (826) garbage collection for a parity stripe that includes the first sub-block, wherein the parity stripe includes a plurality of sub-blocks across a plurality of erase blocks in the storage medium. In some embodiments, for example, a parity stripe spans multiple erase blocks (e.g., a super block), and in order to maintain parity protection, when garbage collection is enabled for the first sub-block (e.g., a page in a first erase block), garbage collection is also enabled for the entire parity stripe that includes the first sub-block (e.g., other pages in one or more other erase blocks).

In accordance with a determination that the second trigger parameter meets (828) a second vulnerability criterion, the storage device enables (834) garbage collection of the second sub-block. In a non-limiting example, the second sub-block has a read-disturb count that which exceeds a read-disturb threshold of 225,000, and thus garbage collection of both the second sub-block is enabled. In some circumstances, enabling garbage of the second sub-block occurs without enabling garbage collection of the first sub-block, because the second trigger parameter meets the second vulnerability criterion while the first trigger parameter does not (or does not yet) meet the first vulnerability criterion.

In some embodiments, the second vulnerability criterion is determined (830) in accordance with one or more characteristics of the second sub-block. See the above discussion of sub-block characteristics and vulnerability criteria. In some implementations, the first vulnerability criterion is distinct (832) from the second vulnerability criterion.

Optionally, in some implementations, garbage collection of the first sub-block is performed (836) prior to (or without) garbage collection of the second sub-block. For example, in some implementations, the second trigger parameter meets the second vulnerability criterion after the first trigger parameter meets the first vulnerability criterion, and thus garbage collection of the second sub-block (e.g., erase block 304-1) is performed at a later time than garbage collection for a first sub-block (e.g., page 304-5).

Method 800 reduces the impact of garbage collection on the endurance of the storage medium, because data stored in vulnerable sub-blocks of an erase block is preserved without erasing the entire erase block (at least until a separate decision is made to garbage collect the remaining valid data in the erase block).

Figure 9:
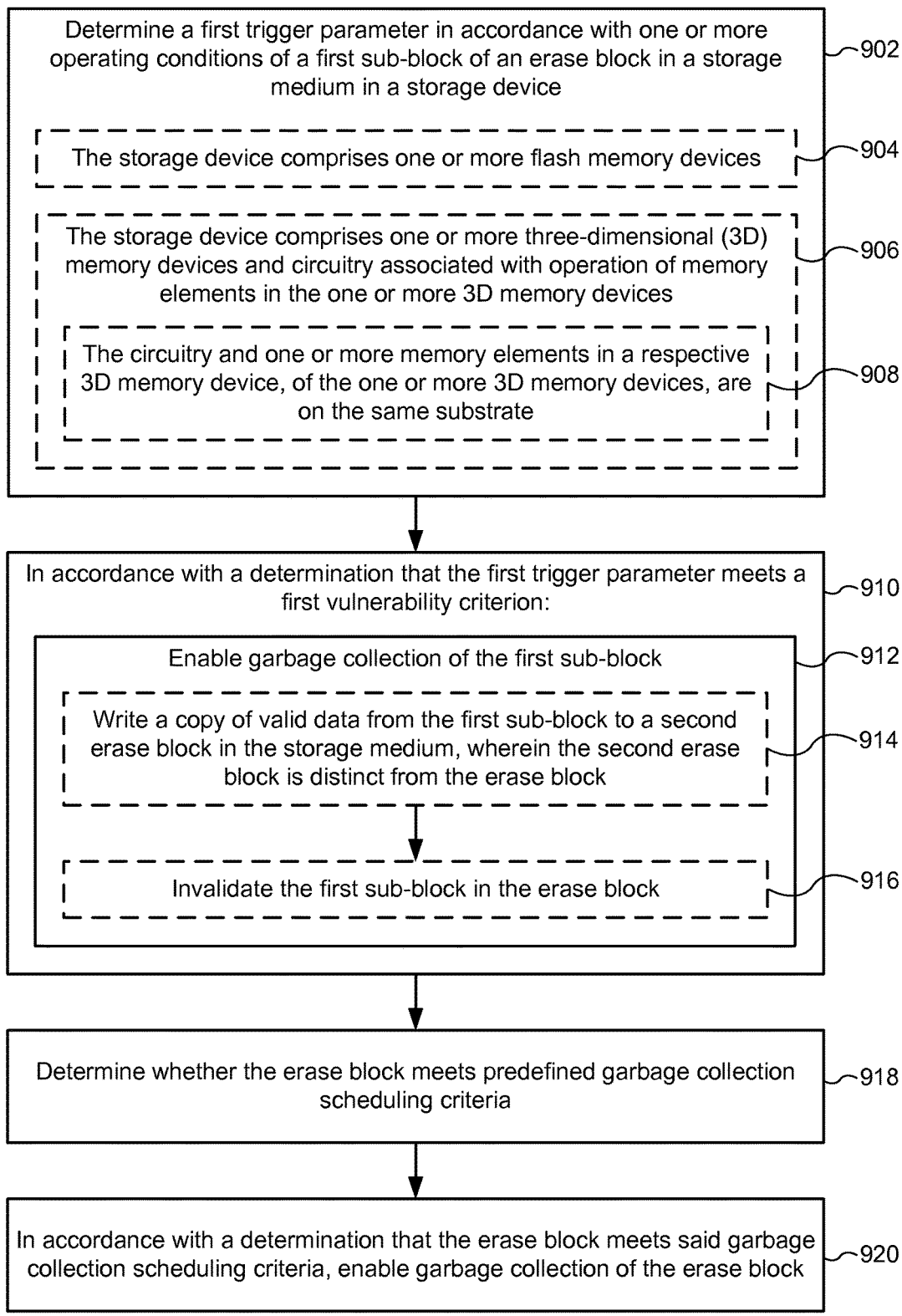
FIG. 9 illustrates a flowchart representation of a method of garbage collection for a storage medium in a storage system, in accordance with some embodiments.

FIG. 9 illustrates a flowchart representation of a method 900 of garbage collection for a storage medium in a storage system, in accordance with some embodiments. As noted above, since erasure of a storage medium is performed on a block basis, but in many embodiments programming of the storage medium is performed on a smaller subunit of a block (e.g., on a page basis), pages with invalid data cannot be overwritten until the whole block containing those pages is erased. The storage device (e.g., storage device 120, FIG. 1) uses garbage collection to reclaim portions of memory (e.g., storage medium 130, FIG. 1) that no longer contain valid data. To reduce the impact of garbage collection on the endurance of a storage medium, however, the storage device (e.g., storage device 120, FIG. 1) first writes copies of valid data in vulnerable sub-blocks to another erase block, while temporarily withholding copying of other valid data in the erase block and erasing the erase block until a separate decision is made to garbage collect the erase block itself (and thus garbage collecting the remaining valid data, if any, in the erase block).

At least in some embodiments, method 900 is performed by a storage device (e.g., storage device 120, FIG. 1) or one or more components of the storage device (e.g., storage controller 124 and/or storage medium 130, FIG. 1), wherein the storage device is operatively coupled with a host system (e.g., computer system 110, FIG. 1). In some embodiments, method 900 is governed by instructions that are stored in a non-transitory computer readable storage medium and that are executed by one or more processors of a device, such as the one or more processing units (CPUs) 122 of management module 121, shown in FIGS. 1 and 2. In some embodiments, method 900 is performed by a storage system (e.g., data storage system 100, FIG. 1) or one or more components of the storage system (e.g., computer system 110 and/or storage device 120, FIG. 1). In some embodiments, some of the operations of method 900 are performed at a host (e.g., computer system 110, FIG. 1) and information is transmitted to a storage device (e.g., storage device 120, FIG. 1). In some embodiments, method 900 is governed, at least in part, by instructions that are stored in a non-transitory computer readable storage medium and that are executed by one or more processors of a host (not shown in FIG. 1). For ease of explanation, the following describes method 900 as performed by a storage device (e.g., storage device 120, FIG. 1). However, those skilled in the art will appreciate that in other embodiments, one or more of the operations described in method 900 are performed by a host (e.g., computer system 110, FIG. 1).

A storage device (e.g., storage device 120, FIG. 1) determines (902) a first trigger parameter in accordance with one or more operating conditions of a first sub-block of an erase block in a storage medium in the storage device. Trigger parameters and operating conditions are discussed in greater detail above with respect to FIG. 8A.

In some embodiments, the storage device includes (904) one or more flash memory devices. Stated another way, in some embodiments the storage device includes a storage medium (e.g., storage medium 130, FIG. 1), and the storage medium includes one or more non-volatile storage devices, such as flash memory devices. In some embodiments, the storage medium (e.g., storage medium 130, FIG. 1) is a single flash memory device, while in other embodiments the storage medium includes a plurality of flash memory devices. For example, in some implementations, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., storage medium 130, FIG. 1) includes NAND-type flash memory or NOR-type flash memory. In other embodiments, the storage medium includes one or more other types of non-volatile storage devices.

In some embodiments, the storage device includes (906) one or more three-dimensional (3D) memory devices and circuitry associated with operation of memory elements in the one or more 3D memory devices. Stated another way, in some embodiments, the storage device includes a storage medium (e.g., storage medium 130, FIG. 1), and the storage medium includes one or more 3D memory devices and circuitry associated with operation of memory elements in the one or more 3D memory devices. In some embodiments, the storage medium (e.g., storage medium 130, FIG. 1) is a single 3D memory device, while in other embodiments the storage medium includes a plurality of 3D memory devices.

Furthermore, in some implementations, the circuitry and one or more memory elements in a respective 3D memory device, of the one or more 3D memory devices, are (908) on the same substrate (e.g., a silicon substrate). In some embodiments, the substrate is a wafer, or a portion (e.g., a die) of a wafer, on which the material layers of the one or more memory elements are deposited and/or in which the one or more memory elements are formed. In some embodiments, the substrate is a carrier substrate which is attached to the one or more memory elements after they are formed. As a non-limiting example, in some embodiments, the substrate includes a semiconductor such as silicon.

In accordance with a determination that the first trigger parameter meets (910) a first vulnerability criterion, the storage device enables (912) garbage collection of the first sub-block. Vulnerability criteria are discussed in greater detail above with respect to FIG. 8B. Furthermore, in some embodiments, garbage collecting the first sub-block includes writing (914) a copy of valid data from the first sub-block to a second erase block in the storage medium, wherein the second erase block is distinct from the erase block, and invalidating (916) the first sub-block in the erase block (i.e., invalidating any valid data remaining in the first sub-block when the first sub-block is garbage collected). An example of garbage collection is illustrated and described in greater detail with respect to FIG. 3.

Furthermore, the storage device determines (918) whether the erase block meets predefined garbage collection scheduling criteria. In accordance with a determination that the erase block meets said garbage collection scheduling criteria, the storage device enables (920) garbage collection of the erase block. In some implementations, the garbage collection scheduling criteria include a determination that the amount of valid data remaining in the erase block falls below a threshold. In some implementations, the garbage collection scheduling criteria include a determination that the erase block is one of N erase blocks in the storage device having the least amount of valid data, where N (a positive integer) is the number of erase blocks needed by the storage device to be available for storing data.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible (e.g., a NOR memory array). NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The term "three-dimensional memory device" (or 3D memory device) is herein defined to mean a memory device having multiple memory layers or multiple levels (e.g., sometimes called multiple memory device levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

One of skill in the art will recognize that this invention is not limited to the two dimensional and three dimensional exemplary structures described but cover all relevant memory structures within the spirit and scope of the invention as described herein and as understood by one of skill in the art.

In some implementations, with respect to any of the methods described above, the storage medium (e.g., storage medium 130, FIG. 1) is a single flash memory device, while in other implementations, the storage medium (e.g., storage medium 130, FIG. 1) includes a plurality of flash memory devices.

In some implementations, with respect to any of the methods described above, a storage system includes a storage medium (e.g., storage medium 130, FIG. 1), one or more processors (e.g., CPUs 122, FIGS. 1 and 2) and memory (e.g., memory 206, FIG. 2) storing one or more programs configured for execution by the one or more processors and configured to perform or control performance of any of the methods described above.

In some implementations, with respect to any of the methods described above, a device operable to perform garbage collection includes a storage medium interface (e.g., storage medium I/O 128, FIG. 1) for coupling the device to the storage medium (e.g., storage medium 130, FIG. 1) and one or more modules, including a memory management module (e.g., management module 121, FIGS. 1 and 2) that includes one or more processors (e.g., CPUs 122, FIGS. 1 and 2) and memory (e.g., memory 206, FIG. 2) storing one or more programs configured for execution by the one or more processors, the one or more modules coupled to the storage medium interface (e.g., storage medium I/O 128, FIG. 1) and configured to perform or control performance of any of the methods described above.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of garbage collection for a storage medium in a storage device, the method comprising:
   determining a first trigger parameter in accordance with one or more operating conditions of a first sub-block of a first erase block in the storage medium, the storage medium having a plurality of erase blocks that include the first erase block, where erase blocks are minimum size erasable units in the storage device and sub-blocks are sub-portions of corresponding erase blocks;
   determining a second trigger parameter in accordance with one or more operating conditions of a second sub-block of the first erase block in the storage medium;
   in accordance with a determination that the first trigger parameter meets a first vulnerability criterion, enabling sub-block garbage collection of the first sub-block; and
   in accordance with a determination that the second trigger parameter meets a second vulnerability criterion, enabling sub-block garbage collection of the second sub-block, wherein the first vulnerability criterion is distinct from the second vulnerability criterion, wherein the first vulnerability criterion is a first read-disturb threshold and the second vulnerability criterion is a second read-disturb threshold, distinct from the first read-disturb threshold, and wherein sub-block garbage collection of a particular sub-block of the first erase block is distinct from garbage collection of the first erase block, and sub-block garbage collection of the particular sub-block of the first erase block includes:
      writing a copy of valid data from the particular sub-block to a second erase block in the storage medium, wherein the second erase block is distinct from the first erase block; and
      invalidating the particular sub-block in the first erase block.

2. The method of claim 1, wherein the first sub-block is a portion of the first erase block and the second sub-block is another portion of the first erase block.

3. The method of claim 1, wherein the first vulnerability criterion is determined in accordance with one or more characteristics of the first sub-block and the second vulnerability criterion is determined in accordance with one or more characteristics of the second sub-block.

4. The method of claim 1, wherein sub-block garbage collection of the first sub-block is performed prior to sub-block garbage collection of the second sub-block.

5. The method of claim 1, further comprising:
   in accordance with the determination that the first trigger parameter meets the first vulnerability criterion, enabling sub-block garbage collection for a parity stripe that includes the first sub-block, wherein the parity stripe includes a plurality of sub-blocks across a plurality of erase blocks in the storage medium.

6. The method of claim 1, wherein enabling sub-block garbage collection of the first sub-block includes enabling sub-block garbage collection of the first sub-block in accordance with the determination that the first trigger parameter meets the first vulnerability criterion and a determination that the first erase block or a memory portion that includes the first erase block meets predefined age criteria.

7. A method of garbage collection for a storage medium in a storage device, the method comprising:
   determining a first trigger parameter in accordance with one or more operating conditions of a first sub-block of a first erase block in the storage medium, the storage medium having a plurality of erase blocks that include the first erase block, where erase blocks are minimum size erasable units in the storage device and sub-blocks are sub-portions of corresponding erase blocks;
   in accordance with a determination that the first trigger parameter meets a first vulnerability criterion, enabling sub-block garbage collection of the first sub-block, wherein the first vulnerability criterion includes a first read-disturb threshold for the first sub-block;

subsequent to enabling sub-block garbage collection of the first sub-block, determining whether the first erase block meets predefined garbage collection scheduling criteria, wherein the garbage collection scheduling criteria is distinct from the first vulnerability criterion and includes a criterion with respect to amount of valid data remaining in the first erase block; and in accordance with a determination that the first erase block meets said garbage collection scheduling criteria, enabling garbage collection of the first erase block, wherein garbage collection of the first erase block is distinct from sub-block garbage collection of the first sub-block.

8. The method of claim 7, wherein sub-block garbage collection of the first sub-block comprises:

writing a copy of valid data from the first sub-block to a second erase block in the storage medium, wherein the second erase block is distinct from the first erase block; and invalidating the first sub-block in the first erase block.

9. The method of claim 7, wherein the storage device comprises one or more flash memory devices.

10. The method of claim 7, wherein the storage device comprises one or more three-dimensional (3D) memory devices and circuitry associated with operation of memory elements in the one or more 3D memory devices.

11. The method of claim 10, wherein the circuitry and one or more memory elements in a respective 3D memory device, of the one or more 3D memory devices, are on the same substrate.

12. The method of claim 7, wherein garbage collection of the first erase block comprises:

writing a copy of valid data from the first erase block to an erase block, other than the first erase block, in the storage medium; and invalidating the first erase block.

13. A storage device, comprising:
a non-transitory storage medium;
one or more processors; and
memory storing one or more programs to be executed by the one or more processors, the one or more programs comprising instructions for:
determining a first trigger parameter in accordance with one or more operating conditions of a first sub-block of a first erase block in the storage medium, the storage medium having a plurality of erase blocks that include the first erase block, where erase blocks are minimum size erasable units in the storage device and sub-blocks are sub-portions of corresponding erase blocks;
determining a second trigger parameter in accordance with one or more operating conditions of a second sub-block of the first erase block in the storage medium;
in accordance with a determination that the first trigger parameter meets a first vulnerability criterion, enabling sub-block garbage collection of the first sub-block; and
in accordance with a determination that the second trigger parameter meets a second vulnerability criterion, enabling sub-block garbage collection of the second sub-block, wherein the first vulnerability criterion is distinct from the second vulnerability criterion, wherein the first vulnerability criterion is a first read-disturb threshold and the second vulnerability criterion is a second read-disturb threshold, distinct from the first read-disturb threshold, and wherein sub-block garbage collection of a particular sub-block of the first erase block is distinct from garbage collection of the first erase block, and sub-block garbage collection of the particular sub-block of the first erase block includes:
writing a copy of valid data from the particular sub-block to a second erase block in the storage medium, wherein the second erase block is distinct from the first erase block; and
invalidating the particular sub-block in the first erase block.

14. The storage device of claim 13, wherein the first sub-block is a portion of the first erase block and the second sub-block is another portion of the first erase block.

15. The storage device of claim 13, wherein the first vulnerability criterion is determined in accordance with one or more characteristics of the first sub-block and the second vulnerability criterion is determined in accordance with one or more characteristics of the second sub-block.

16. The storage device of claim 13, wherein sub-block garbage collection of the first sub-block is performed prior to sub-block garbage collection of the second sub-block.

17. The storage device of claim 13, wherein the one or more programs further comprise instructions for enabling sub-block garbage collection for a parity stripe that includes the first sub-block, in accordance with the determination that the first trigger parameter meets the first vulnerability criterion, wherein the parity stripe includes a plurality of sub-blocks across a plurality of erase blocks in the storage medium.

18. The storage device of claim 13, wherein enabling sub-block garbage collection of the first sub-block include enabling sub-block garbage collection of the first sub-block in accordance with a determination that the first trigger parameter meets the first vulnerability criterion and a determination that the first erase block or a memory portion that includes the first erase block meets predefined age criteria.

19. A storage system, comprising:
a non-transitory storage medium;
one or more processors; and
memory storing one or more programs to be executed by the one or more processors, the one or more programs comprising instructions for:
determining a first trigger parameter in accordance with one or more operating conditions of a first sub-block of a first erase block in the storage medium, the storage medium having a plurality of erase blocks that include the first erase block, where erase blocks are minimum size erasable units in the storage device and sub-blocks are sub-portions of corresponding erase blocks;
in accordance with a determination that the first trigger parameter meets a first vulnerability criterion, enabling sub-block garbage collection of the first sub-block, wherein the first vulnerability criterion includes a first read-disturb threshold for the first sub-block;
subsequent to enabling sub-block garbage collection of the first sub-block, determining whether the first erase block meets predefined garbage collection scheduling criteria, wherein the garbage collection scheduling criteria is distinct from the first vulnerability criterion and includes a criterion with respect to amount of valid data remaining in the first erase block; and
in accordance with a determination that the first erase block meets said garbage collection scheduling criteria, enabling garbage collection of the first erase block, wherein garbage collection of the first erase block is distinct from sub-block garbage collection of the first sub-block.

20. The storage system of claim 19, wherein sub-block garbage collection of the first sub-block comprises:
  writing a copy of valid data from the first sub-block to a second erase block in the storage medium, wherein the second erase block is distinct from the first erase block; and
  invalidating the first sub-block in the first erase block.

21. The storage system of claim 19, wherein the storage medium comprises one or more flash memory devices.

22. The storage system of claim 19, wherein the storage medium comprises one or more three-dimensional (3D) memory devices and circuitry associated with operation of memory elements in the one or more 3D memory devices.

23. The storage system of claim 22, wherein the circuitry and one or more memory elements in a respective 3D memory device, of the one or more 3D memory devices, are on the same substrate.

24. The storage system of claim 19, wherein garbage collection of the first erase block comprises:
  writing a copy of valid data from the first erase block to an erase block, other than the first erase block, in the storage medium; and
  invalidating the first erase block.

* * * * *